(12) United States Patent  
Shinomiya

(10) Patent No.: US 12,068,925 B2
(45) Date of Patent: Aug. 20, 2024

(54) LATENCY REDUCTION SYSTEM FOR NETWORK COMMUNICATIONS

(71) Applicant: NEC Corporation, Tokyo (JP)

(72) Inventor: Kiyoshi Shinomiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/914,866

(22) PCT Filed: Mar. 22, 2021

(86) PCT No.: PCT/JP2021/011731
§ 371 (c)(1),
(2) Date: Sep. 27, 2022

(87) PCT Pub. No.: WO2021/193542
PCT Pub. Date: Sep. 30, 2021

(65) Prior Publication Data
US 2023/0145589 A1 May 11, 2023

(30) Foreign Application Priority Data
Mar. 27, 2020 (JP) ................................ 2020-057408

(51) Int. Cl.
*H04L 41/16* (2022.01)
*H04L 45/74* (2022.01)
*H04L 47/28* (2022.01)

(52) U.S. Cl.
CPC .............. *H04L 41/16* (2013.01); *H04L 45/74* (2013.01); *H04L 47/28* (2013.01)

(58) Field of Classification Search
CPC ..... H04L 69/16; H04L 69/167; H04L 67/565; H04L 67/5651; H04L 69/04;
(Continued)

(56) References Cited

U.S. PATENT DOCUMENTS

| 5,172,228 A * | 12/1992 | Israelsen ............. H04N 19/184 |
| | | 375/E7.184 |
| 2002/0055966 A1* | 5/2002 | Border ................. H04L 69/163 |
| | | 709/200 |

(Continued)

FOREIGN PATENT DOCUMENTS

| EP | 2642702 B1 | 4/2019 |
| JP | 2004-280640 A | 10/2004 |

(Continued)

OTHER PUBLICATIONS

International Search Report for PCT Application No. PCT/JP2021/011731, mailed on Jun. 8, 2021.

(Continued)

*Primary Examiner* — Djenane M Bayard

(57) ABSTRACT

In the present invention, a first communication device, on the basis of a portion of a first command inputted from an external device, predicts an address and instruction contents for the first command, and outputs the same as a second command. The first communication device outputs first flag information indicating whether a second communication device needs to wait to send the second command, and sends the second command and the first flag information to the second communication device. The second communication device receives the second command and the first flag information, and, if the first flag information indicates that the second communication device does not need to wait to send the second command, sends the second command to a second external device.

12 Claims, 26 Drawing Sheets

(58) Field of Classification Search
CPC ... H04L 69/161; H04L 1/0016; H04L 1/0061; H04L 41/16; H04L 45/74; H04L 47/28; H04L 67/06; H04L 67/568; H04L 69/22; H04L 69/322; H04L 45/7453; H04L 61/2503; H04L 61/35; H04L 67/2876; H04L 69/28; H04L 41/12; H04L 41/147; H04L 41/0886; H04L 41/0896; H04L 41/5003; H04L 41/0894; H04L 41/0893
See application file for complete search history.

(56) References Cited

U.S. PATENT DOCUMENTS

| | | | | |
|---|---|---|---|---|
| 2004/0003179 | A1* | 1/2004 | Shirahige | G06F 12/0862 |
| | | | | 711/219 |
| 2008/0320185 | A1 | 12/2008 | Shirase | |
| 2012/0131184 | A1* | 5/2012 | Luna | H04W 4/18 |
| | | | | 709/224 |
| 2019/0303227 | A1 | 10/2019 | Nakamura | |
| 2021/0021577 | A1* | 1/2021 | Sazonov | H04L 63/0428 |

FOREIGN PATENT DOCUMENTS

| | | |
|---|---|---|
| JP | 2015-032985 A | 2/2015 |
| JP | 2016-031547 A | 3/2016 |
| JP | 2019-176263 A | 10/2019 |
| WO | 2007/097017 A1 | 8/2007 |

OTHER PUBLICATIONS

English translation of Written opinion for PCT Application No. PCT/JP2021/011731, mailed on Jun. 8, 2021.
Lee et al., "Outatime: Using Speculation to Enable Low-Latency Continuous Interaction for Cloud Gaming", <URL: https://www.microsoft.com/en-us/research/wp-content/uploads/2016/02/outatime_techreport2014.pdf>, pp. 1-14.
Extended European Search Report for EP Application No. 21776242.6, dated on Sep. 4, 2023.

* cited by examiner

Fig. 4

| ENTRY NUMBER | SECOND COMMAND: ADDRESS | SECOND COMMAND: INSTRUCTION CONTENT | FIRST FLAG INFORMATION |
|---|---|---|---|
| 1 | 1100 | 1 (READ) | 0 |
| 2 | 1200 | 0 (WRITE) | 1 |
| : | : | : | : |
| N | 2000 | 0 (WRITE) | 0 |

| ENTRY NUMBER | SECOND COMMAND: ADDRESS (HUFFMAN CODED) | SECOND COMMAND: INSTRUCTION CONTENT | FIRST FLAG INFORMATION |
|---|---|---|---|
| 1 | 0XXXX | 1 (READ) | 1 |
| 2 | 10XXX | 0 (WRITE) | 0 |
| 3 | 110XX | 1 (READ) | 0 |
| ⋮ | ⋮ | ⋮ | ⋮ |

250

LATENCY REDUCTION SYSTEM FOR NETWORK COMMUNICATIONS

This application is a National Stage Entry of PCT/JP2021/011731 filed on Mar. 22, 2021, which claims priority from Japanese Patent Application 2020-057408 filed on Mar. 27, 2020, the contents of all of which are incorporated herein by reference, in their entirety.

TECHNICAL FIELD

The present disclosure relates to a communication system, and particularly to command transmission.

BACKGROUND ART

In recent years, for the purpose of speeding up communication, it is becoming common to use a high-speed connection device of a point to point type from a bus device that has been used conventionally for a network construction. As a network construction method, it is becoming common to use a packet-switched network. While communication is being sped up by a high-speed connection device of a point to point type or a packet-switched network, latency of communication has been increasing due to a routing function by a header, a footer, or a switch in a packet.

On the other hand, in recent years, there has been a rapid progress in replacing work that has conventionally been performed locally with a cloud service. Conventional legacy devices are often used for locally performed work, and are still being used for local low-speed buses. Such legacy devices are often prioritized in terms of cost, and are less likely to be redesigned to support high-speed connection interfaces. Therefore, there has been a continuous demand for a technique capable of connecting to a packet-switched network free from redesign of a legacy device and more easily connecting a cloud and the legacy device.

A low-speed bus to which a legacy device is connected sometimes has no choice but to further slow down due to latency of the packet-switched network. For example, in a bus operating at 1 MHz, 1 us is one clock, and the bus sometimes return a response at 1 us. In the packet-switched network, latency is not fixed, but becomes about 10 us when communication is possible at 1 Gbps. In this case, since the latency of the packet-switched network becomes 10 times 1 us, which is the response time of the bus, it is necessary to coincide with the clock of the bus to 10 us in accordance with the latency of the packet-switched network. Then, the operation clock of the bus decreases to about 100 kHz, and it has been necessary to further reduce the low transfer speed that is originally lower than that in the packet-switched network.

As a technique for reducing latency, cut-through communication is generally known (See, for example, Patent Literature 1 (PTL1)). A technique for predicting a subsequent command from a previously transmitted command is known (See, for example, Patent Literature 2 (PTL2)). In addition, a technique for predicting input by a user using a Markov chain model to reduce latency is known (See, for example, Non Patent Literature 1 (NPL1)).

CITATION LIST

Patent Literature

[PTL1] Japanese Patent Application Laid-Open No. 2019-176263 (JP2019-176263A)

[PTL2] Japanese Patent Application Laid-Open No. 2004-280640 (JP2004-280640A)

Non Patent Literature

[NPL1] Outatime: Using Speculation to Enable Low-Latency Continuous Interaction for Cloud Gaming https://www.microsoft.com/en-us/research/wp-content/uploads/2016/02/outatime_techreport2014.pdf

SUMMARY OF INVENTION

Technical Problem

The inventor has studied a transmission method of a command via a network and has found various problems. Specifically, for example, in a system where a first device connected to a network transmits a command, when the latency of the connected network is large, there is a possibility that a second device to which the command is transmitted cannot respond to the command within the response time of the device that has transmitted the command.

One objective that the example embodiments disclosed herein to achieve is to reduce latency of communications via the network. It should be noted that this object is merely one of a plurality of objects to be achieved by the plurality of example embodiments disclosed herein. Other objects or problems and novel features will be made apparent from the description of the present description or the accompanying drawings.

Solution to Problem

In a first aspect, a communication system includes a first external device, a second external device, a first communication device, and a second communication device. The first communication device includes a command prediction unit and a first communication processing unit. The command prediction unit is configured to predict an address and instruction content in a first command from a part of the first command having been input from the first external device, output, as a second command, the address and the instruction content having been predicted, and output first flag information indicating whether the second communication device needs to wait for transmission of the second command. The first communication processing unit is configured to transmit the second command and the first flag information to the second communication device. The second communication device includes a second communication processing unit. The second communication processing unit is configured to receive the second command and the first flag information, and transmit the second command to the second external device when the first flag information indicates that the second communication device does not need to wait for transmission of the second command.

Advantageous Effects of Invention

According to the above aspect, it is possible to provide a communication system that contributes to reducing latency of communication via a network.

BRIEF DESCRIPTION OF DRAWINGS

FIG. 4 is a view illustrating a configuration example of a prediction table according to an example embodiment.

FIG. 5 is a view illustrating a configuration example of the prediction table according to an example embodiment.

EXAMPLE EMBODIMENT

Figure 1:
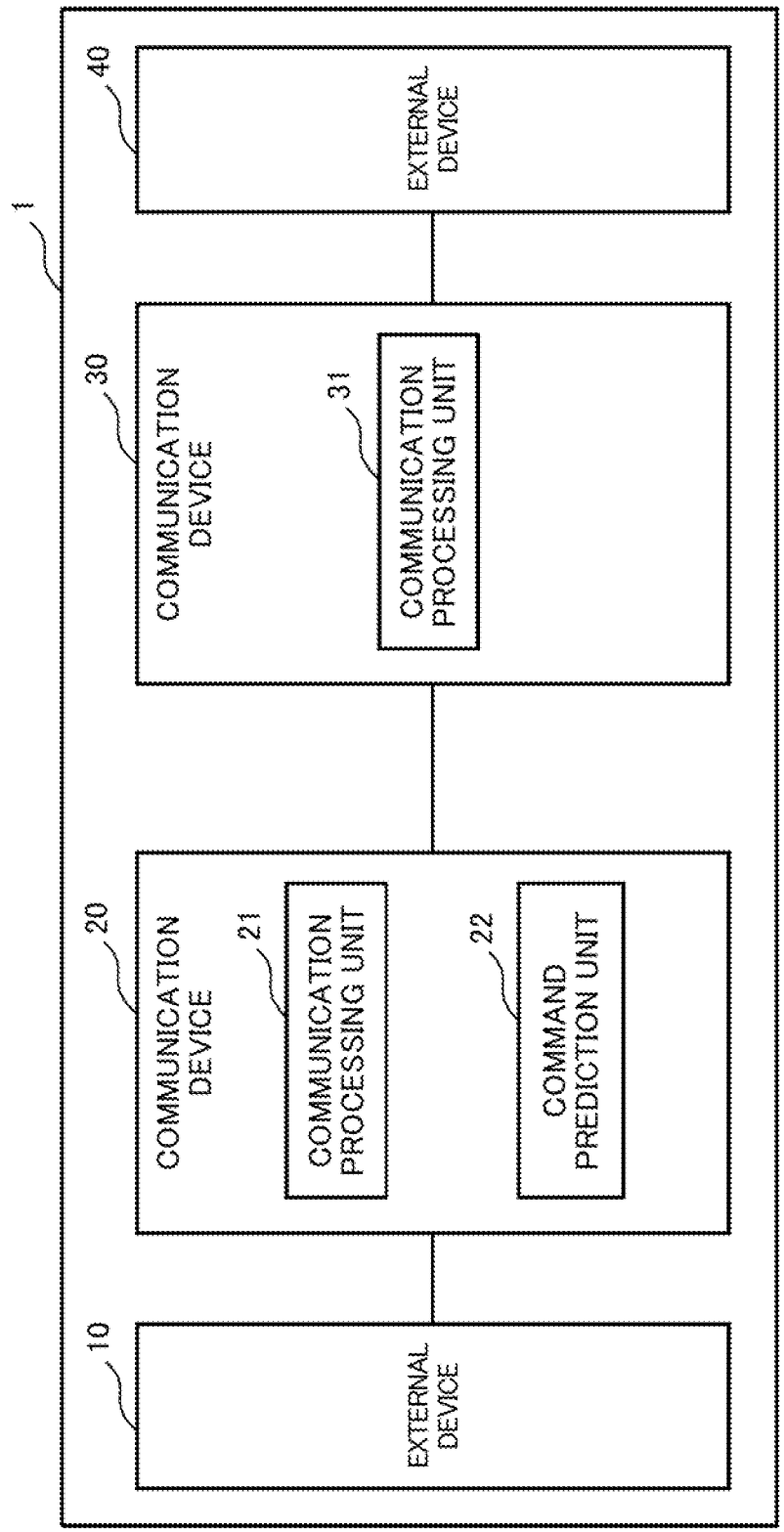
FIG. 1 is a view illustrating a configuration example of a communication system according to an example embodiment.

Specific example embodiments will be described below in detail with reference to the drawings. In the drawings, the same or corresponding elements are denoted by the same reference signs, and redundant description will be omitted as necessary in order to simplify the description.

The example embodiments described below can be implemented independently, or can be implemented in appropriate combination. The plurality of example embodiments have novel features different from one another. Therefore, the plurality of example embodiments contribute to different objects or solving problems, and contribute to achieving effects different from one another.

First Example Embodiment

FIG. 1 illustrates a configuration example of a communication system 1 according to the present example embodiment. Each of the elements shown in FIG. 1 is a network function. Each of the elements shown in FIG. 1 can be implemented, for example, as dedicated hardware, as software running on dedicated hardware, or as a virtualization function instantiated on an application platform running on general-purpose hardware.

In the example of FIG. 1, the communication system 1 includes an external device 10, a communication device 20, a communication device 30, and an external device 40. The communication device 20 includes a communication processing unit 21 and a command prediction unit 22, and the communication device 30 includes a communication processing unit 31.

Examples of the external device include, but are not limited to, a communication apparatus such as a computer present on a network, and various registers or the like present in the apparatus. The communication device is an apparatus directly connected to a network, and examples the communication device include, but are not limited to, a router device, a hub device, a network interface card, a computer present or the like on the network.

The external devices and the communication devices described in the present example embodiment may be connected via a packet-switched network or may be directly connected by a communication cable or the like. Naturally, examples of the connection method to the packet-switched network and the direct connection method of the external devices and the communication devices include, but are not limited to, wireless communication connection and wired communication connection.

The communication processing unit 21 is connected to the external device 10 and the communication device 30 via the network. The communication processing unit 21 receives a command for the external device 10 and transmits a command and first flag information to other devices including the external device 40.

The communication processing unit 31 is connected to the external device 40 and the communication device 20 via the network. The communication processing unit 31 receives a command for the external device 40 and the first flag information. In a case where the first flag information indicates that it is not necessary to wait for transmission of the command to the external device 40, the communication processing unit 31 transmits the command to the external device 40.

The command in the present example embodiment includes instruction content to the device and an address indicating a transmission destination of the instruction content. Examples of the description format of the address include Internet Protocol version 4 (IPv4), Internet Protocol version 6 (IPv6) or the like, but are not limited to as long as the communication device or the external device to which the command is transmitted can be specified. The instruction content include, but are not limited to, Read, Write and the like.

The command prediction unit 22 predicts the instruction content and the address in the first command from a part of the first command having been input from the external device 10, and outputs, as the second command, the instruction content and the address having been predicted.

The first command in the present example embodiment is a command that is actually output from the external device 10 and includes the instruction content to the external device and the address of the external device. In addition, the second command in the present example embodiment is a command that the communication device 20 predicts from a part of the first command and outputs.

The command prediction unit 22 also outputs the first flag information.

The first flag information indicates whether the communication device 30 needs to wait for transmission of the second command to the external device 40. More specifically, in a case where it is necessary for the communication device 30 to wait for transmission of the second command to the external device 40, the first flag information is given 1. For the second command in which the first flag information is not given 1, the first flag information is given 0.

An example in which the first flag information is given 1 for the command will be described. For example, in a case where the address refers to a power control register of an apparatus and a command including an instruction indicating Write is transmitted to the address, there is a possibility that the power of the apparatus that receives and executes the command is turned off. Therefore, for such a command, the first flag information is given 1.

It should be noted that the reference for giving 1 to the first flag information does not depend only on the instruction content included in the command. For example, for a command including an instruction indicating Read with respect to an address associated with a register that records the state of an apparatus, the register is not greatly affected. Therefore, for the command, the first flag information is given 0. However, even if an instruction indicating the same Read is included, the first flag information is sometimes given 1 depending on the external device indicated by the address. For example, there is a register such as a Read & Clear register in which contents are erased after a Read instruction is executed. For the second command including a Read instruction for such register, the first flag information is given 1.

Figure 2:
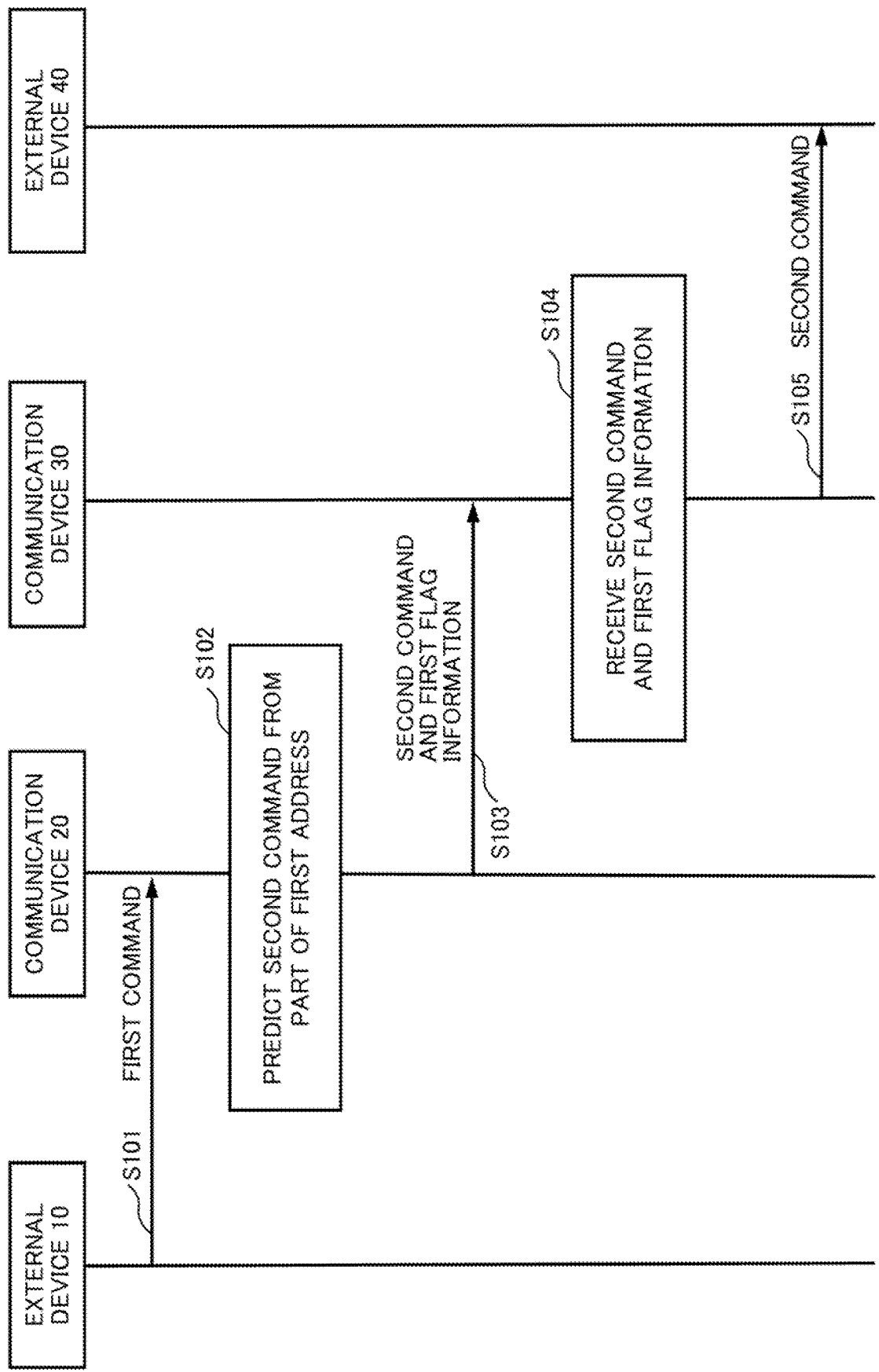
FIG. 2 is a flowchart illustrating an example of an operation of the communication system according to an example embodiment.

Subsequently, determination of the second command and a transmission method according to the present example embodiment will be described below with reference to an example illustrated in FIG. 2.

In the present example embodiment, the communication device 20 predicts the second command from a part of the first command (S101) input from the external device 10 (S102), and transmits the second command together with the first flag information to the communication device 30 (S103). The communication device 30 receives the second command and the first flag information (S104), and transmits the second command to the external device 40 when it is not necessary to wait for transmission of the second command to the external device 40 (S105).

Second Example Embodiment

Figure 3:
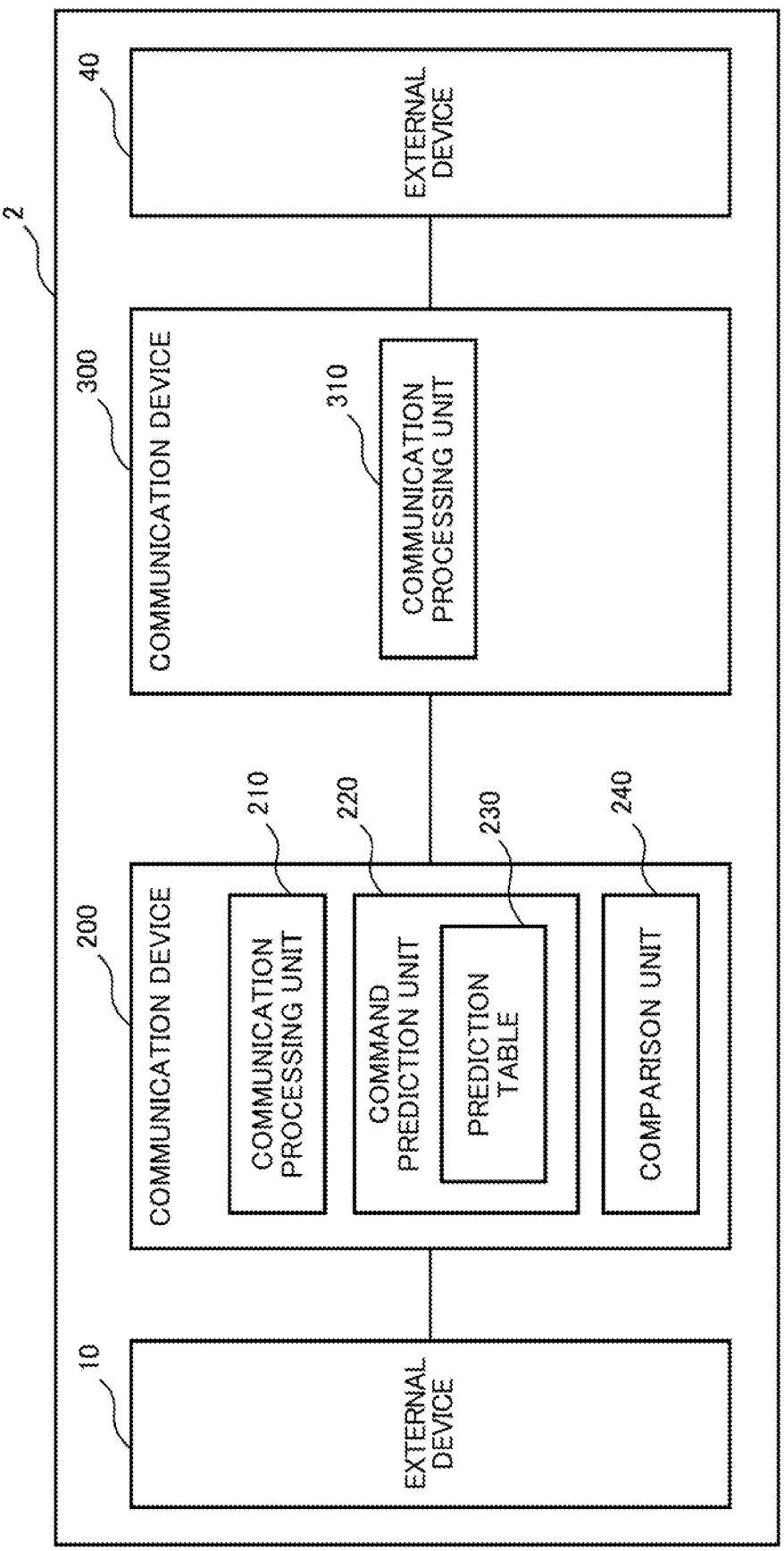
FIG. 3 is a view illustrating a configuration example of the communication system according to an example embodiment.

FIG. 3 illustrates a configuration example of a communication system 2 according to the present example embodiment. In the present example embodiment, a communication device 200 includes a communication processing unit 210, a command prediction unit 220, and a comparison unit 240.

The communication processing unit 210 is connected to the external device 10 and a communication device 300, similarly to the communication processing unit 21 in the first example embodiment. The communication processing unit 210 receives a command for the external device 40 and transmits the command, the first flag information, and the comparison result to other devices including the communication device 300.

The command prediction unit 220 holds a prediction table 230 illustrated in FIG. 4 or a prediction table 250 illustrated in FIG. 5. The command prediction unit 220 predicts a command similarly to the command prediction unit 22 in the first example embodiment, and outputs the predicted command as a second command. The command prediction unit 220 outputs the first flag information, similarly to the command prediction unit 22 in the first example embodiment.

The first flag information indicates whether the communication device 300 needs to wait for transmission of the second command to the external device 40. More specifically, in a case where it is necessary for the communication device 300 to wait for transmission of the second command to the external device 40, the first flag information is given 1. For the second command in which the first flag information is not given 1, the first flag information is given 0.

In other words, the first flag information indicates whether the second command greatly affects the external device 40. For example, in a case where the transmission destination is the Read & Clear register illustrated in the first example embodiment, the instruction content in the second command is Read, and the prediction of the first command is wrong (in a case where the first command and the second command do not match), unintended data erasure is performed when the command is transmitted to the register. In such a case, there is a possibility that the second command greatly affects the external device 40, and the first flag information in the second command is given 1.

The comparison unit 240 compares the first command with the second command and outputs a comparison result. As described in the first example embodiment, the first command is a command that is actually output from the external device 10 and includes the instruction content to the external device and the address of the external device. As described in the first example embodiment, the second command is a command that the communication device 20 predicts from a part of the first command and outputs. The comparison unit 240 compares the instruction content described in the first command and the address indicating the transmission destination of the instruction content with the instruction content described in the second command and the address indicating the transmission destination of the instruction content. In addition, the comparison unit 240 outputs a comparison result.

The communication device 300 in the present example embodiment includes a communication processing unit 310. The communication processing unit 310 is connected to the external device 40 and the communication device 200 similarly to the communication processing unit 31 in the first example embodiment. The communication processing unit 310 receives the command for the external device 40, the first flag information, and the comparison result from the communication device 200. In a case where the first flag information indicates 0 (it is not necessary to wait for transmission of the second command), the communication processing unit 310 transmits a command to the external device 40. In a case where the first flag information indicates 1 (it is necessary to wait for transmission of the second command), the communication processing unit 310 waits for transmission of the command to the external device 40 until the comparison result is received.

The prediction table 230 included in command prediction unit 220 will be described with reference to FIG. 4. The prediction table 230 includes an entry number, an address to which the instruction content of the second command is transmitted, the instruction content of the second command, and the first flag information. For example, the address described in the prediction table 230 may be compressed by the appearance probability of the address. Examples of the compression method include, but are not limited to, Huffman encoding. The prediction table 230 may be updated by various means as necessary.

Address compression using Huffman encoding and a second command prediction method using the prediction table 250 described by the compressed address will be described with reference to FIG. 5.

Huffman encoding is one of the methods for compressing in such a way that the higher the frequency of the command to be executed is, the shorter the bit strings with which identification can be performed is. In the case of the prediction table 250 illustrated in FIG. 5, the smaller the entry number of the command is, the higher the probability that the external device 10 transmits is. Therefore, the command whose entry number is 1 is given 0 to the first bit. It is assumed that the command execution rate per unit time is calculated and the total of the execution probabilities of the entry numbers 1 to 3 is 98%. In this case, the second command output at the time point of receiving up to the head 3 bits of the address matches the first command with a probability of 98%.

Figure 6:
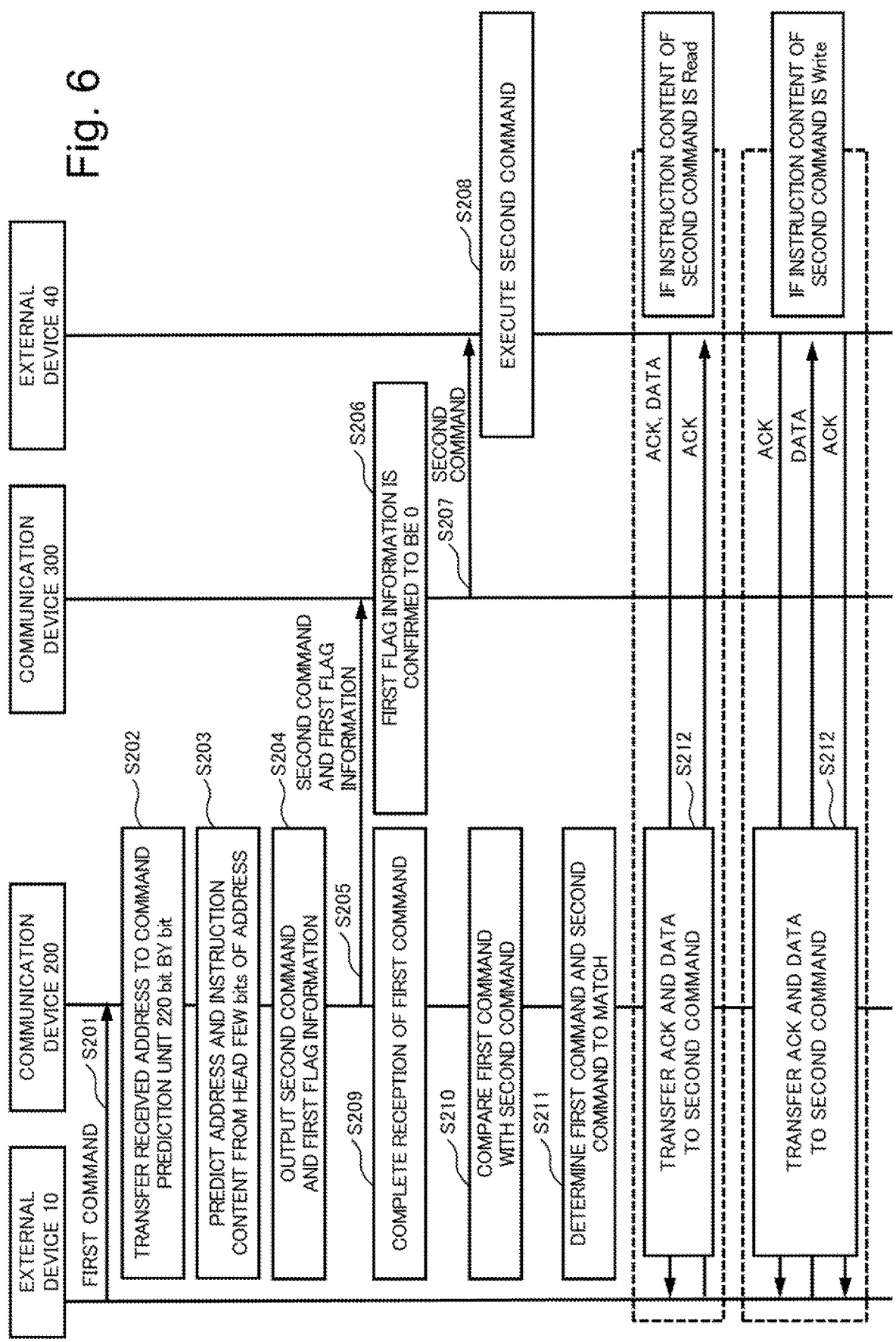
FIG. 6 is a flowchart illustrating an example of the operation of the communication system according to an example embodiment.
Figure 7:
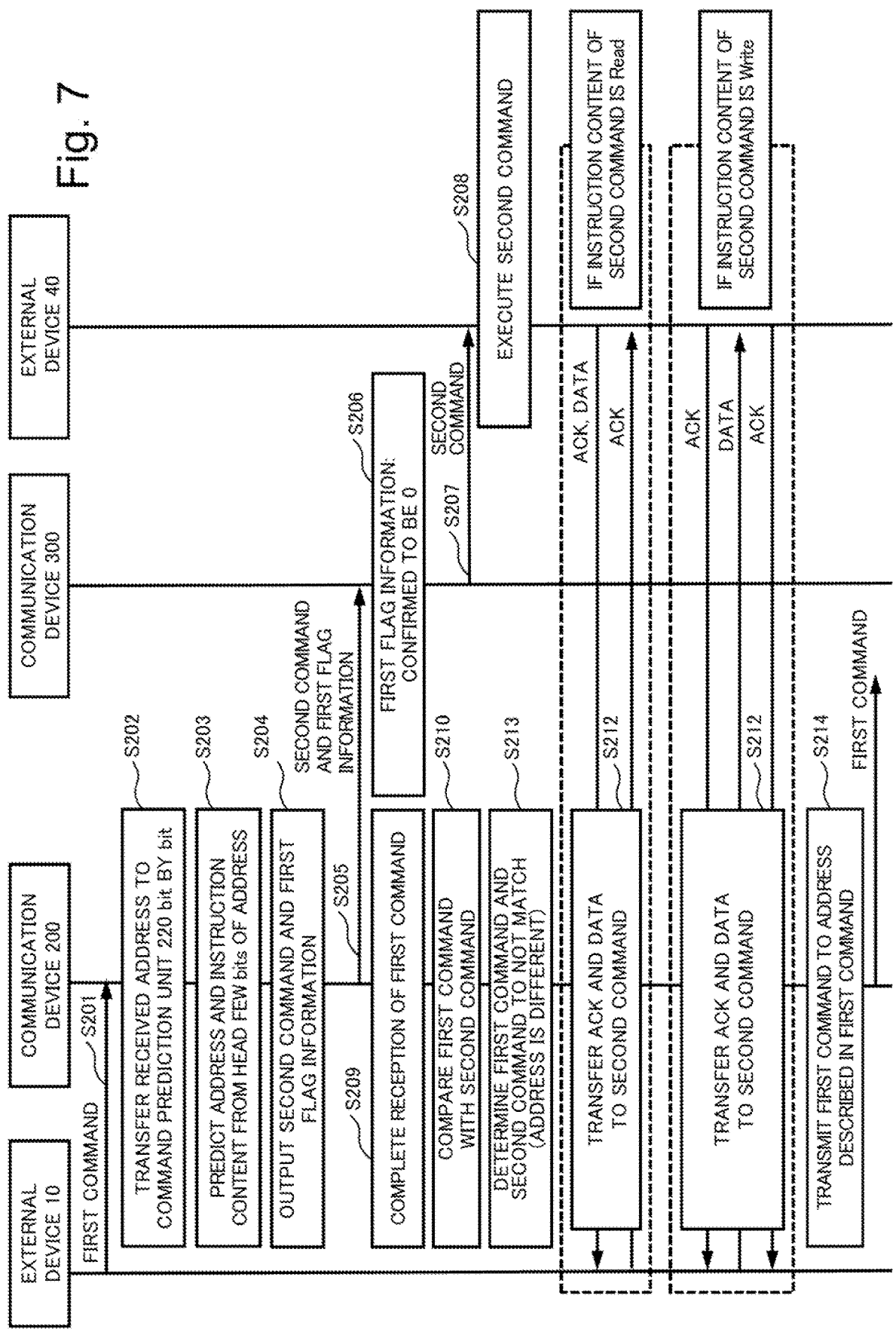
FIG. 7 is a flowchart illustrating an example of the operation of the communication system according to an example embodiment.
Figure 8:
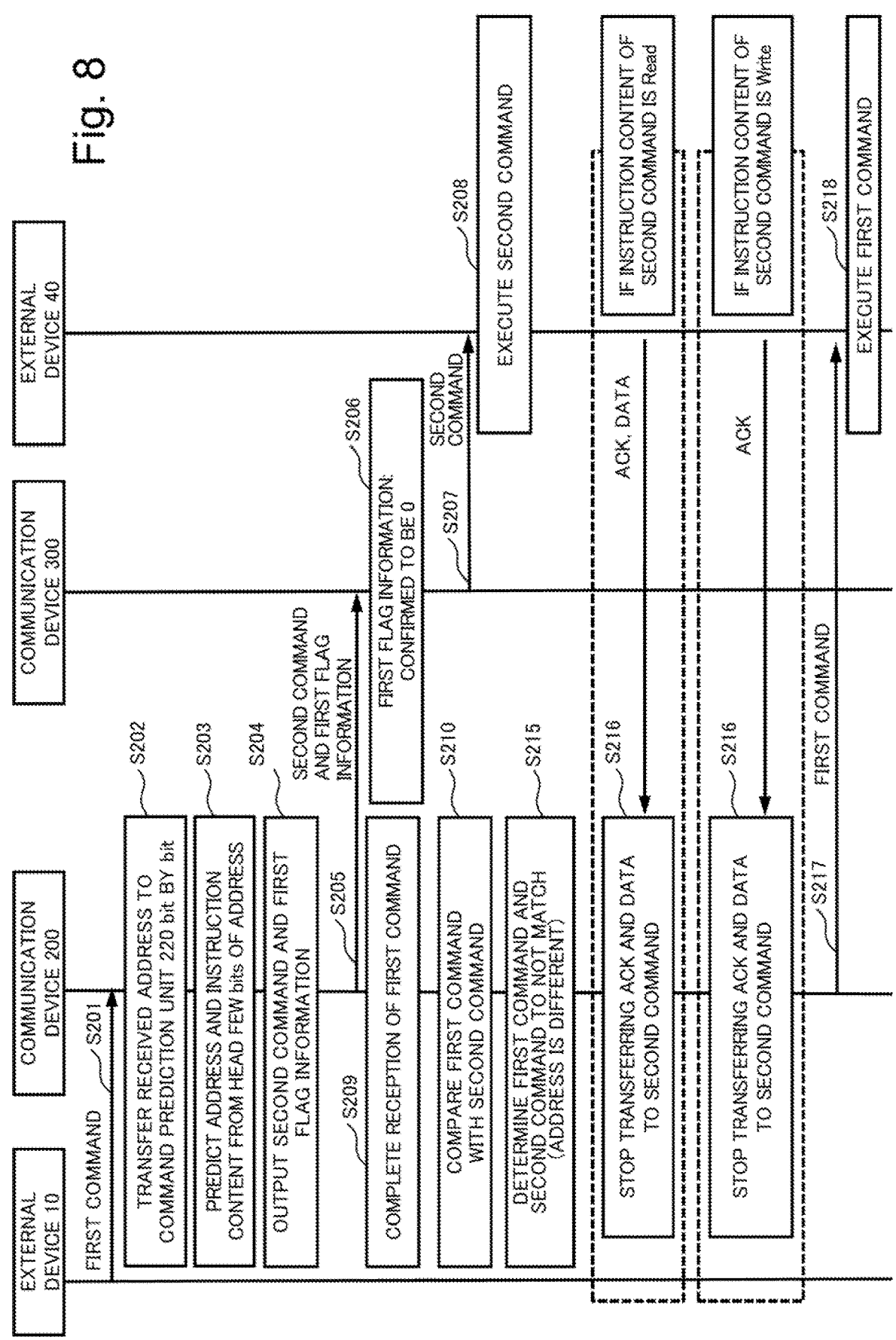
FIG. 8 is a flowchart illustrating an example of the operation of the communication system according to an example embodiment.

Subsequently, the operation of the communication system 2 according to the present example embodiment will be described below with reference to FIGS. 6 to 11. FIGS. 6 to 8 illustrate the operation in a case where the communication processing unit 310 does not need to wait for transmission of a command to the external device 40 (a case where the received first flag information indicates 0).

First, the operation when the first command and the second command match will be described with reference to FIG. 6.

First, the external device 10 transmits the first command from the address portion to the communication device 200 (S201). The communication device 200 starts receiving the first command from the external device 10 using the communication processing unit 210. Every time 1 bit is received, the communication processing unit 210 transfers the received address to the command prediction unit 220 bit by bit (S202). The command prediction unit 220 predicts the first command using the prediction table 230 or the prediction table 250 (S203). Here, the address and the instruction content are predicted from the head few bits of the address.

Then, at the time point when the first command can be predicted, the command prediction unit 220 outputs the predicted command as the second command to the communication processing unit 210 (S204). The command prediction unit 220 outputs the first flag information to the communication processing unit 210 (S204). For example, in a case where the transmission destination of the address and the instruction content can be predicted by the head 3 bits of the received address, the command prediction unit 220 outputs the predicted command to the communication processing unit 210 as a second command, and also outputs, to the communication processing unit 210, the first flag information associated to the second command. The communication processing unit 210 transmits the second command and the first flag information to the communication device 300 (S205). The communication processing unit 310 in the communication device 300 receives the second command and the first flag information from the communication device 200. The communication device 300 confirms the first flag information (S206). In a case where the first flag information indicates 0 (it is not necessary to wait for transmission of the second command), the communication device 300 transmits the second command to the external device 40 (S207). The operation in a case where the first flag information indicates 1 (in a case where it is necessary to wait for transmission of the second command) will be described later.

The external device 40 receives the second command from the communication device 300 and executes the instruction content included in the second command (S208). On the other hand, upon completing the reception of the first command (S209), the communication processing unit 210 in the communication device 200 transfers the first command and the second command to the comparison unit 240. The comparison unit 240 compares the first command with the second command (S210). When the first command and the second command match (S211), the communication processing unit 210 performs transfer of a response signal (ACK) to the second command and transfer of data to be transmitted and received between the external device 10 and the external device 40 based on the second command (S212). The operation when the first command and the second command do not match will be described later.

Due to this, the communication system 2 according to the present example embodiment can prevent the external device 10 from giving an unintended influence to the external device 40 by the second command, and can reduce the latency of the response to the command transmitted by the external device 10.

Figure 23A:
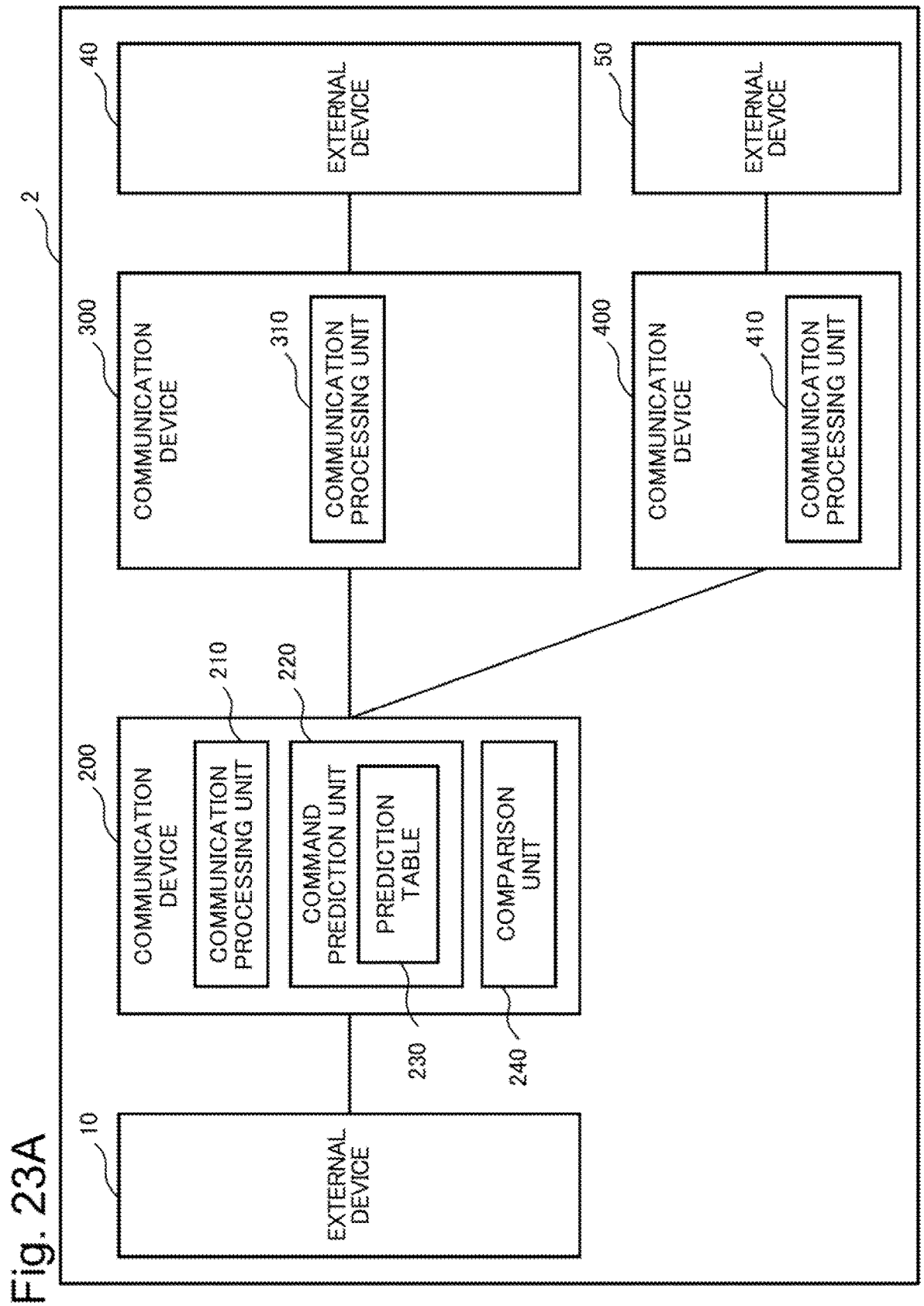
FIG. 23A is a view illustrating another configuration example of the communication system according to an example embodiment.

Next, the operation when the first command and the second command do not match, particularly when the addresses do not match will be described with reference to FIG. 7. The operations from S201 to S210 are the same as the above-described operations. The comparison unit 240 of the communication device 200 determines that the addresses of the first command and the second command do not match (S213). Since the second command has already been transmitted to the external device 40 in S207, the communication processing unit 210 executes the same operation as in S212. The communication processing unit 210 transmits the first command to the address described in the first command (S214). Here, a case where the address described in the first command indicates a communication device different from the communication device 300 will be described. FIG. 23A is a view illustrating another configuration example of the communication system according to an example embodiment. The communication system in FIG. 23A includes the external device 10, the communication device 200, the communication device 300, and the external device 40, similarly to FIG. 3. The communication system in FIG. 23A includes a communication device 400 and an external device 50. The communication device 400 includes a communication processing unit 410. Here, for example, in a case where the address described in the first command indicates the communication device 400, the communication processing unit 210 transmits the first command to the external device 50 via the communication device 400. The external device 50 executes the first command. Note that FIGS. 6 and 7 are examples in a case where the instruction content in the second command is Read or Write, but the second command is not limited to them.

According to the above operation, in the communication system 2 according to the present example embodiment, even when a command is transmitted to a wrong address in command prediction, the communication device 200 does not perform cancellation of the command. Therefore, by preventing unnecessary cancellation, it is possible to prevent waste of communication resources.

Next, the operation when the first command and the second command do not match, in particular, when the instruction contents do not match will be described with reference to FIG. 8. The operations from S201 to S210 are the same as the above-described operations. The comparison unit 240 determines that the instruction contents of the first command and the second command do not match (S215). The communication processing unit 210 stops the transfer of the ACK for the second command and the transfer of the data transmitted and received between the external device 10 and the external device 40 based on the second command (S216).

The communication processing unit 210 transmits the first command to the communication device 300 (S217). The communication device 300 transmits the first command to the external device 40 (S217). The external device 40 executes the first command (S218). The above operation makes it possible to, in the communication system 2, prevent a wrong command from consuming various resources of the communication device 200.

Figure 9:
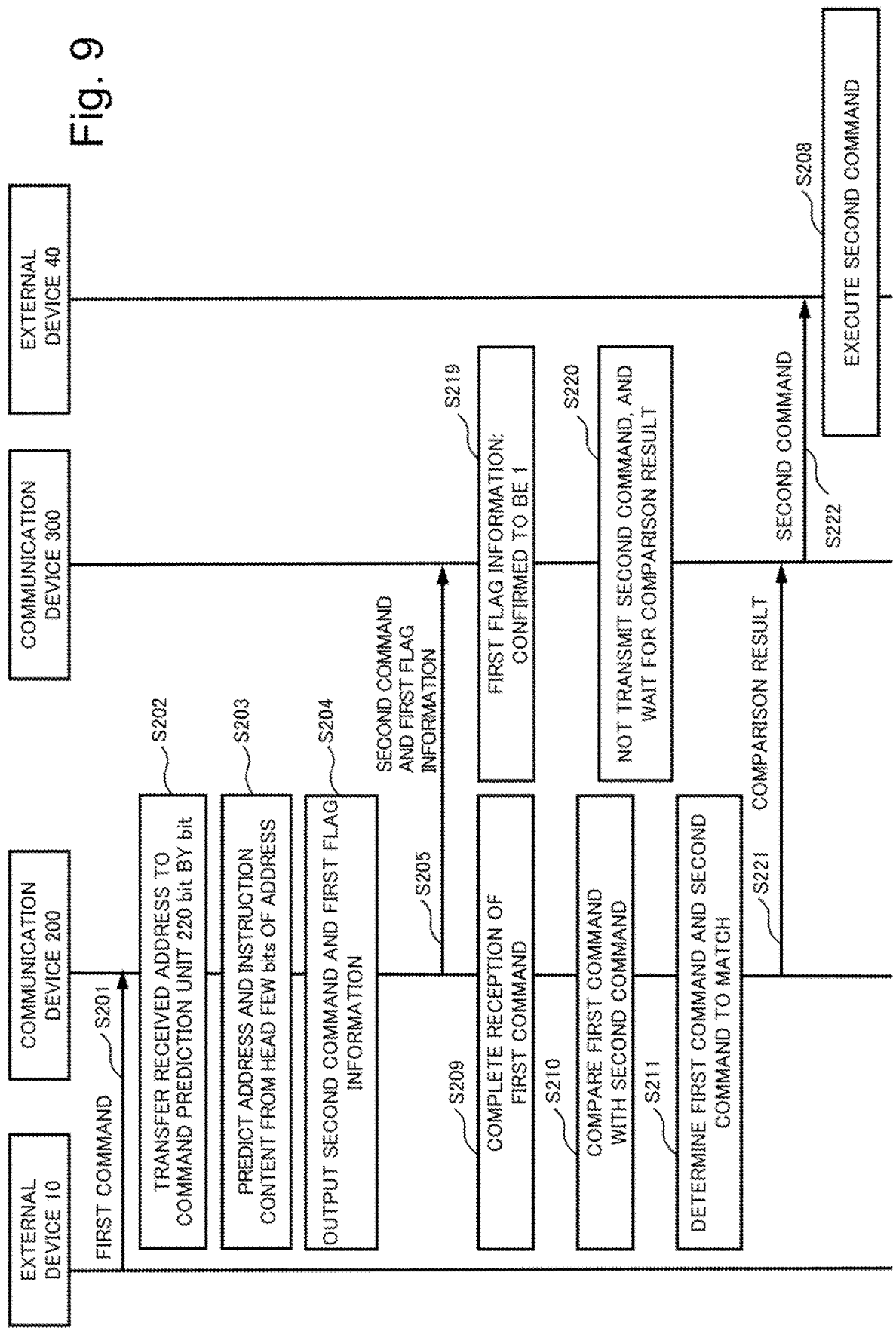
FIG. 9 is a flowchart illustrating an example of the operation of the communication system according to an example embodiment.
Figure 10:
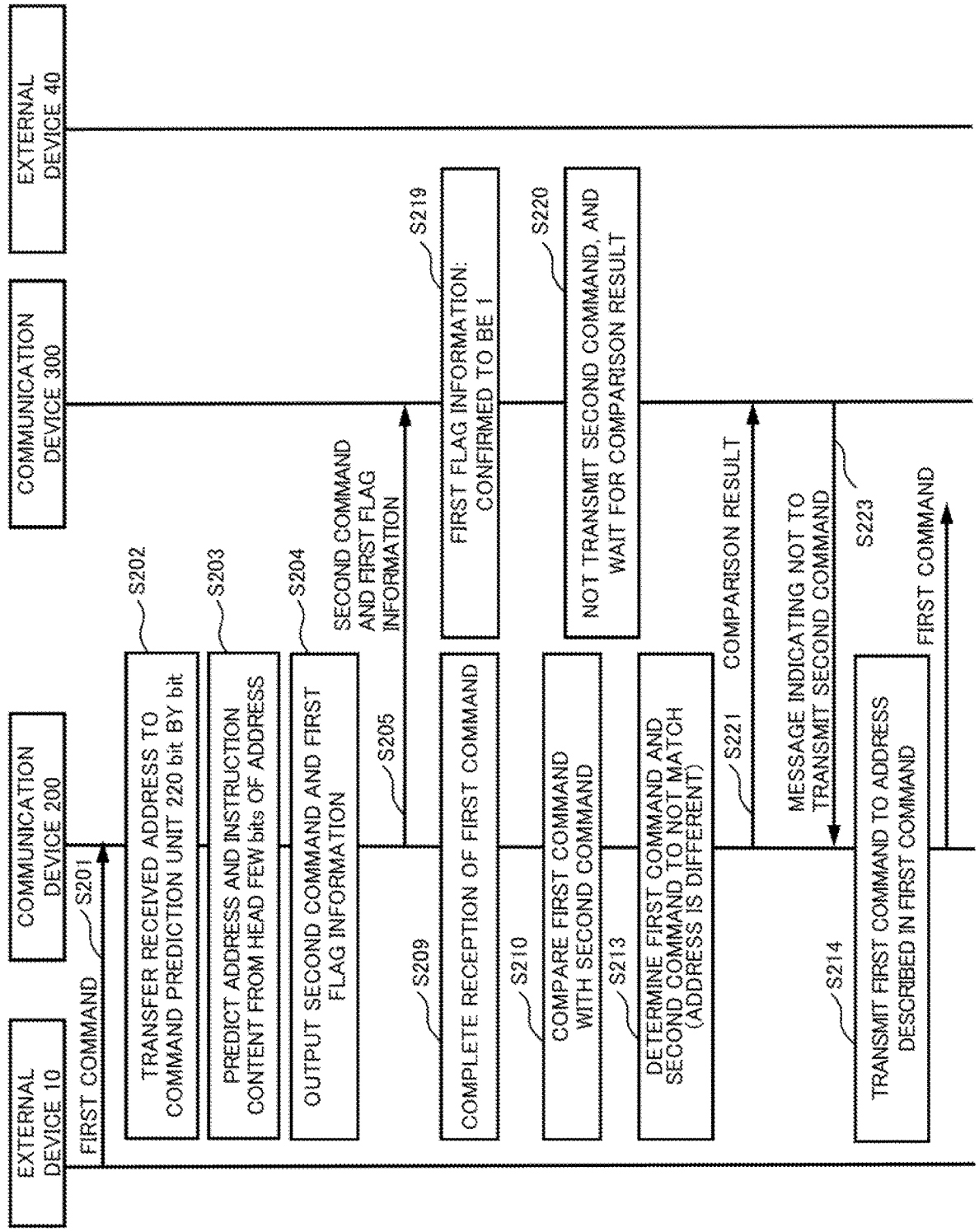
FIG. 10 is a flowchart illustrating an example of the operation of the communication system according to an example embodiment.

Next, the operation in a case where the communication processing unit 310 needs to wait for transmission of the second command (in a case where the first flag information indicates 1) will be described with reference to FIGS. 9 to 11. FIG. 9 illustrates the operation in a case where the communication processing unit 310 needs to wait for transmission of the second command (in a case where the first flag information indicates 1) and the comparison result between the first command and the second command indicates that the address of the first command and the address of the second command match. The operations from S201 to S205 are the same as the above-described operations. When the first flag information indicates 1 (S219), the communication device 300 does not transmit the received second command to the external device 40, and waits for a comparison result between the first command and the second command (S220). The operations from S209 to 211 in the communication device 200 are the same as the above-described operations. The communication processing unit 210 transmits the comparison result to the communication device 300 (S221). Since the comparison result between the first command and the second command indicates that the first command and the second command match, the communication processing unit 310 transmits the second command to the external device 40 (S222). The operation in a case where the comparison result output by the comparison unit 240 indicates that the first command and the second command are different will be described later. The external device 40 executes the second command in the same manner as in S208.

Due to this, the communication system 2 according to the present example embodiment can prevent the external device 10 from giving an unintended influence to the external device 40 by the second command, and can reduce the latency of the response to the command transmitted by the external device 10.

Figure 23B:
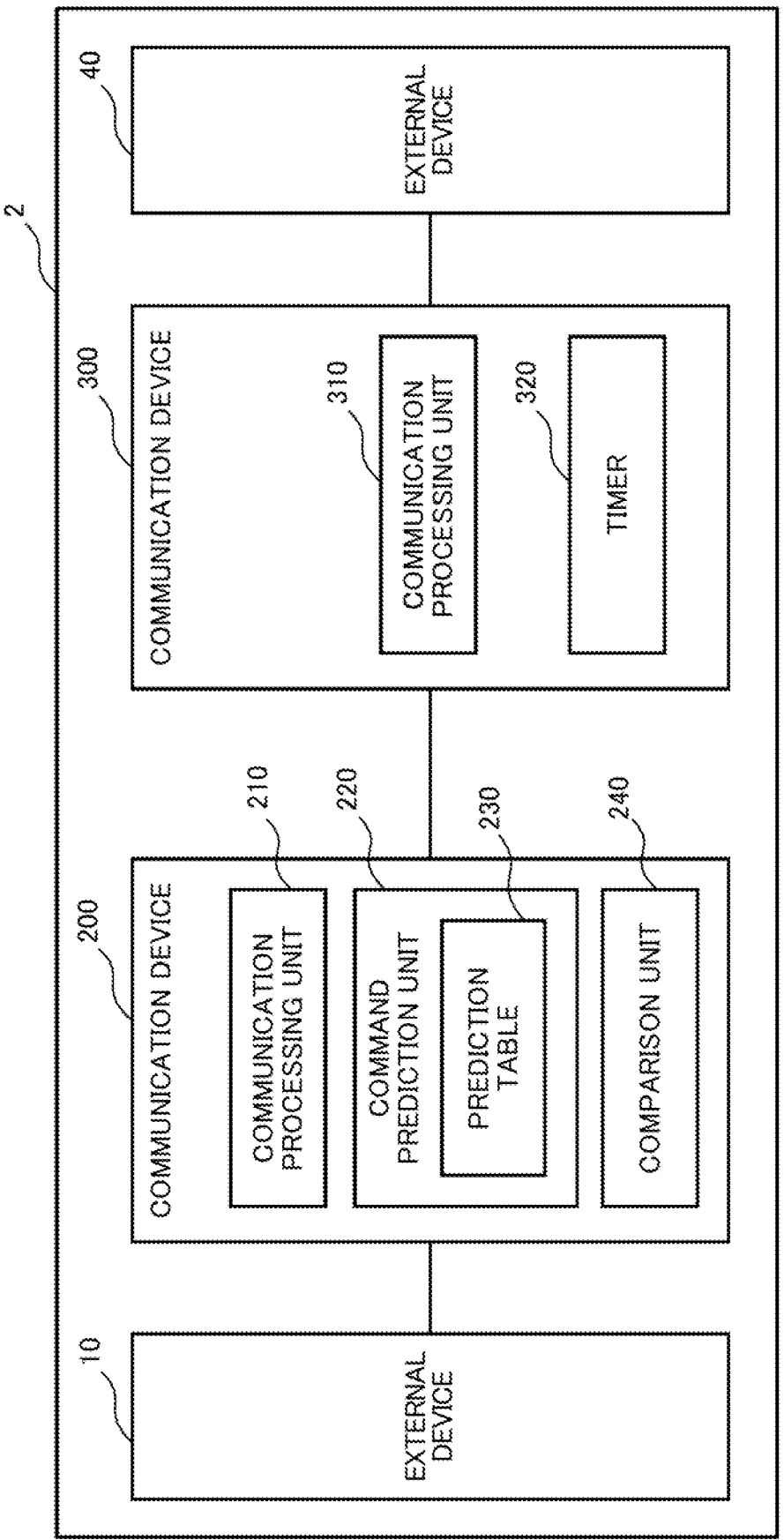
FIG. 23B is a view illustrating another configuration example of the communication system according to an example embodiment.

Next, a case where the first flag information indicates 1 and the comparison result between the first command and the second command indicates that the address of the first command and the address of the second command do not match will be described with reference to FIG. 10. In a case where the first flag information indicates 1 (necessity to wait for transmission of the second command) and the comparison result between the first command and the second command indicates that the address of the first command and the address of the second command do not match, the communication processing unit 310 transmits, to the communication device 200, a message indicating that the communication processing unit 310 does not transmit the second command to the external device 40 (S223). Operations other than S223 are as described above. The communication processing unit 210 may execute the operation of S214 immediately after determining that the address of the first command and the address of the second command do not match in S213. In this case, the operations of S221 and S223 become unnecessary. The configuration for executing such operation will be described. FIG. 23B is a view illustrating another configuration example of the communication system according to an example embodiment. The communication system in FIG. 23B includes the external device 10, the communication device 200, the communication device 300, and the external device 40, similarly to FIG. 6. The communication device 300 in FIG. 23B includes the communication processing unit 310 and a timer 320. That is, the communication device 300 includes the timer 320, and the timer 320 sets a discretionary time and starts countdown after executing the operation of S220. When the count becomes 0, the communication device 300 stops waiting for the comparison result and discards the second command.

Due to this, in the communication system 2 according to the present example embodiment, in a case where the predicted command (second command) has a large influence on the external device 40, it is possible to prevent the external device 10 from giving an unintended large influence to the external device 40 by the second command, and transmit the first command to an intended communication device.

Next, a case where the first flag information indicates 1, and the comparison result between the first command and the second command indicates that the instruction content in the first command and the instruction content in the second command do not match will be described with reference to FIG. 11.

Figure 11:
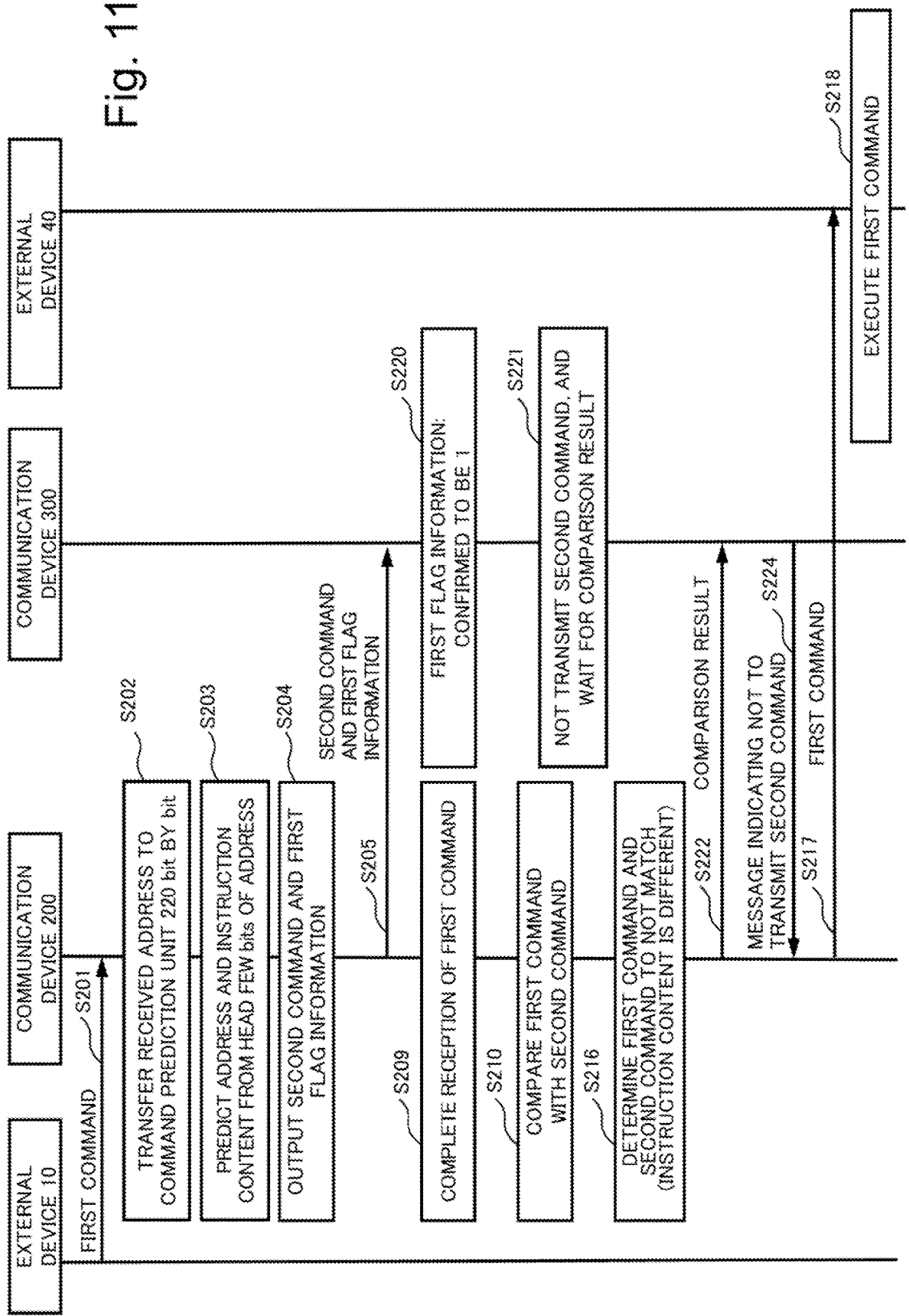
FIG. 11 is a flowchart illustrating an example of the operation of the communication system according to an example embodiment.

In FIG. 11, each operation is the same as that described above. By combining the above-described operations as in FIG. 11, in the communication system 2 according to the present example embodiment, in a case where the predicted command (second command) has a large influence on the external device 40, it is possible to prevent the external device 10 from giving an unintended large influence to the external device 40 by the second command, and transmit the first command to the communication device 300.

Third Example Embodiment

Figure 12:
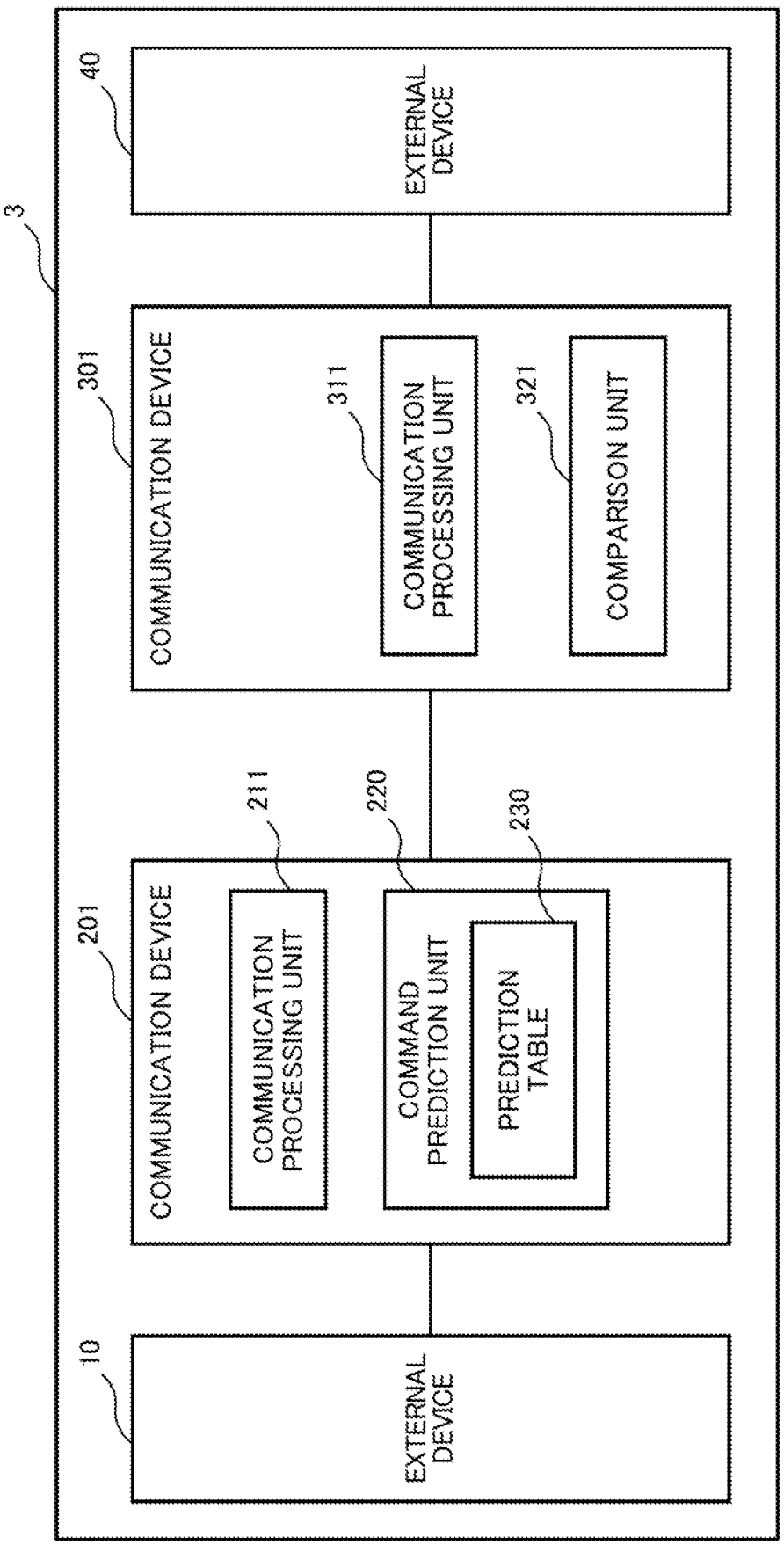
FIG. 12 is a view illustrating a configuration example of the communication system according to an example embodiment.

FIG. 12 illustrates a configuration example of a communication system 3 according to the present example embodiment. In the present example embodiment, the communication device 201 includes a communication processing unit 211 and the command prediction unit 220.

The communication processing unit 211 is connected to the external device 10 and the communication device 301, similarly to the communication processing unit 21 in the first example embodiment. The communication processing unit 211 receives a command for the external device 40 and transmits the command and the first flag information to other devices including the communication device 301.

The command prediction unit 220 holds a prediction table 230 illustrated in FIG. 4 or a prediction table 250 illustrated in FIG. 5. The command prediction unit 220 predicts a command similarly to the operation of the command prediction unit 220 in the second example embodiment, and outputs the predicted command as the second command. The command prediction unit 220 outputs the first flag information, similarly to the command prediction unit 22 in the first example embodiment.

The first flag information indicates whether the communication device 301 needs to wait for transmission of the second command to the external device 40. More specifically, in a case where it is necessary for the communication device 301 to wait for transmission of the second command to the external device 40, the first flag information is given 1. For the second command in which the first flag information is not given 1, the first flag information is given 0. In other words, the first flag information indicates whether the second command greatly affects the external device 40. For example, in a case where the transmission destination is the Read & Clear register illustrated in the first example embodiment and the instruction content in the second command includes Read, and in a case where the prediction of the first command is wrong (in a case where the first command and the second command do not match), unintended data erasure is performed when the command is transmitted to the register. In such a case, there is a possibility that the second command greatly affects the external device 40, and the first flag information in the second command is given 1.

The communication device 301 in the present example embodiment includes a communication processing unit 311 and a comparison unit 321. The communication processing unit 311 is connected to the external device 40 and the communication device 201, similarly to the communication processing unit 31 in the first example embodiment. The communication processing unit 311 receives the command to the external device 40 and the first flag information. In addition, similarly to the second example embodiment, the communication processing unit 311 determines whether to transmit the second command to the external device based on the first flag information.

Similarly to the comparison unit 240 in the second example embodiment, the comparison unit 321 compares the first command with the second command and outputs a comparison result. As described in the first example embodiment, the first command is a command that is actually output from the external device 10 and includes the instruction content to the external device and the address of the external device. As described in the first example embodiment, the second command is a command that the communication device 20 predicts from a part of the first command and outputs.

Figure 13:
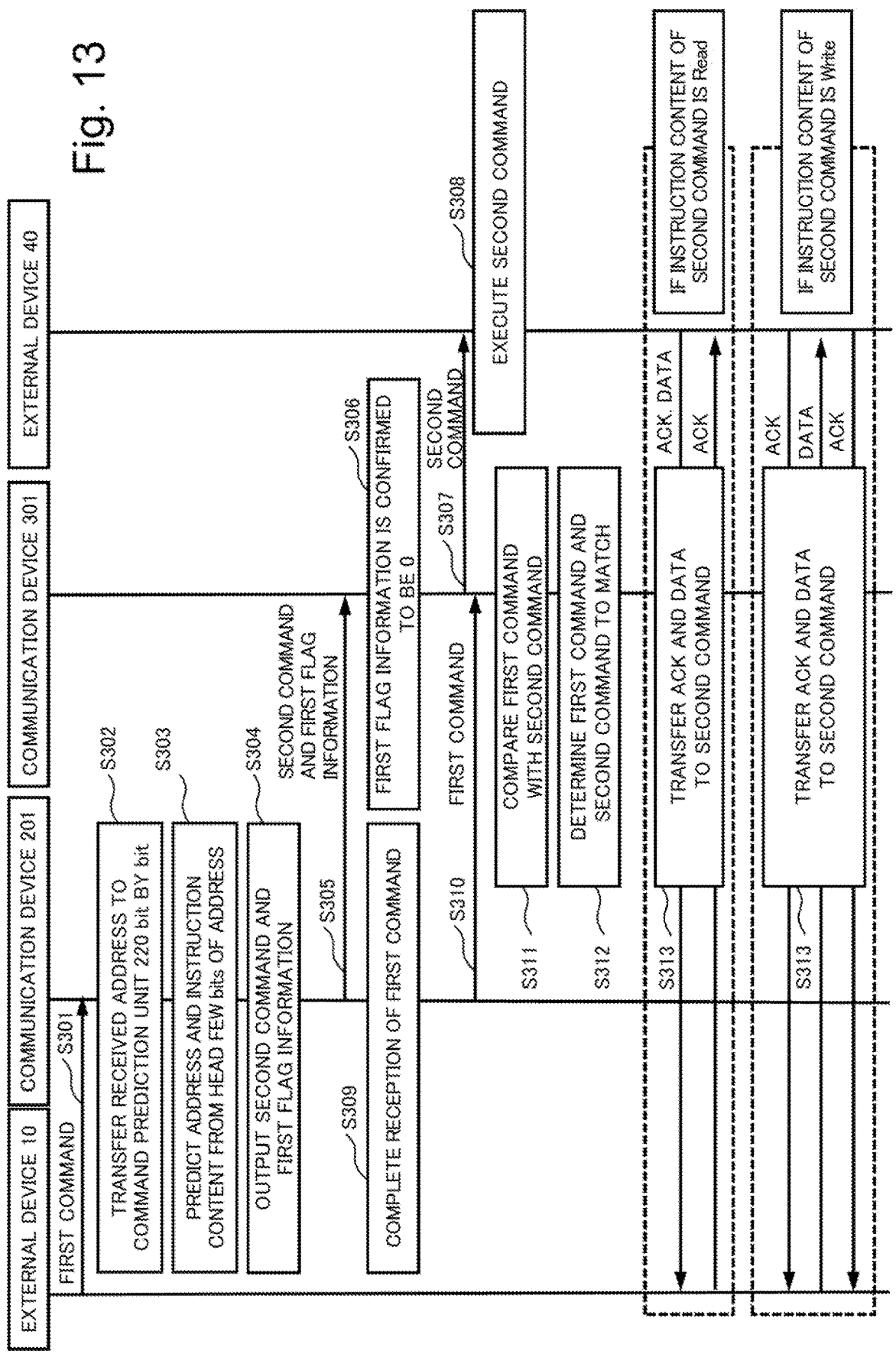
FIG. 13 is a flowchart illustrating an example of the operation of the communication system according to an example embodiment.
Figure 14:
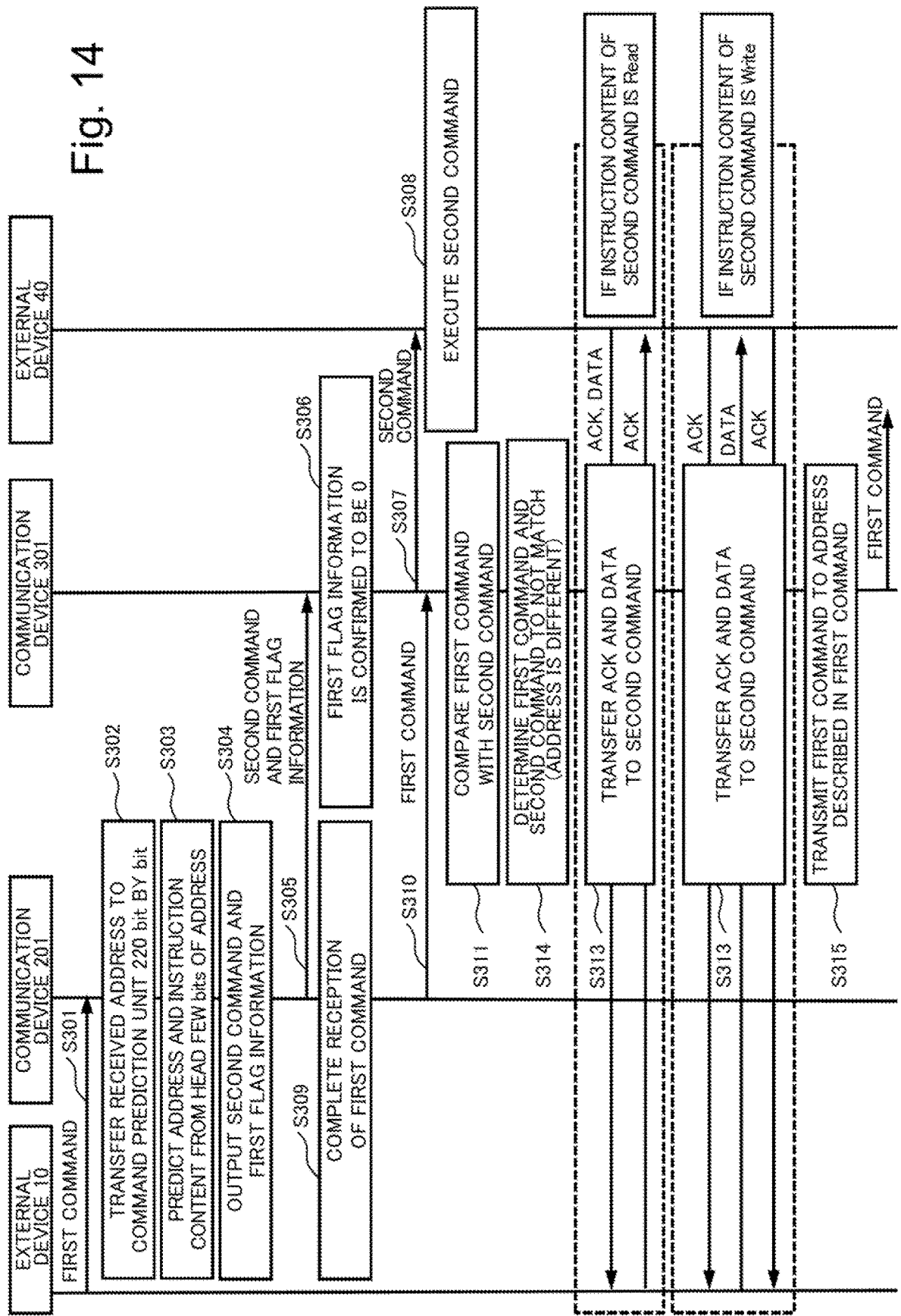
FIG. 14 is a flowchart illustrating an example of the operation of the communication system according to an example embodiment.
Figure 15:
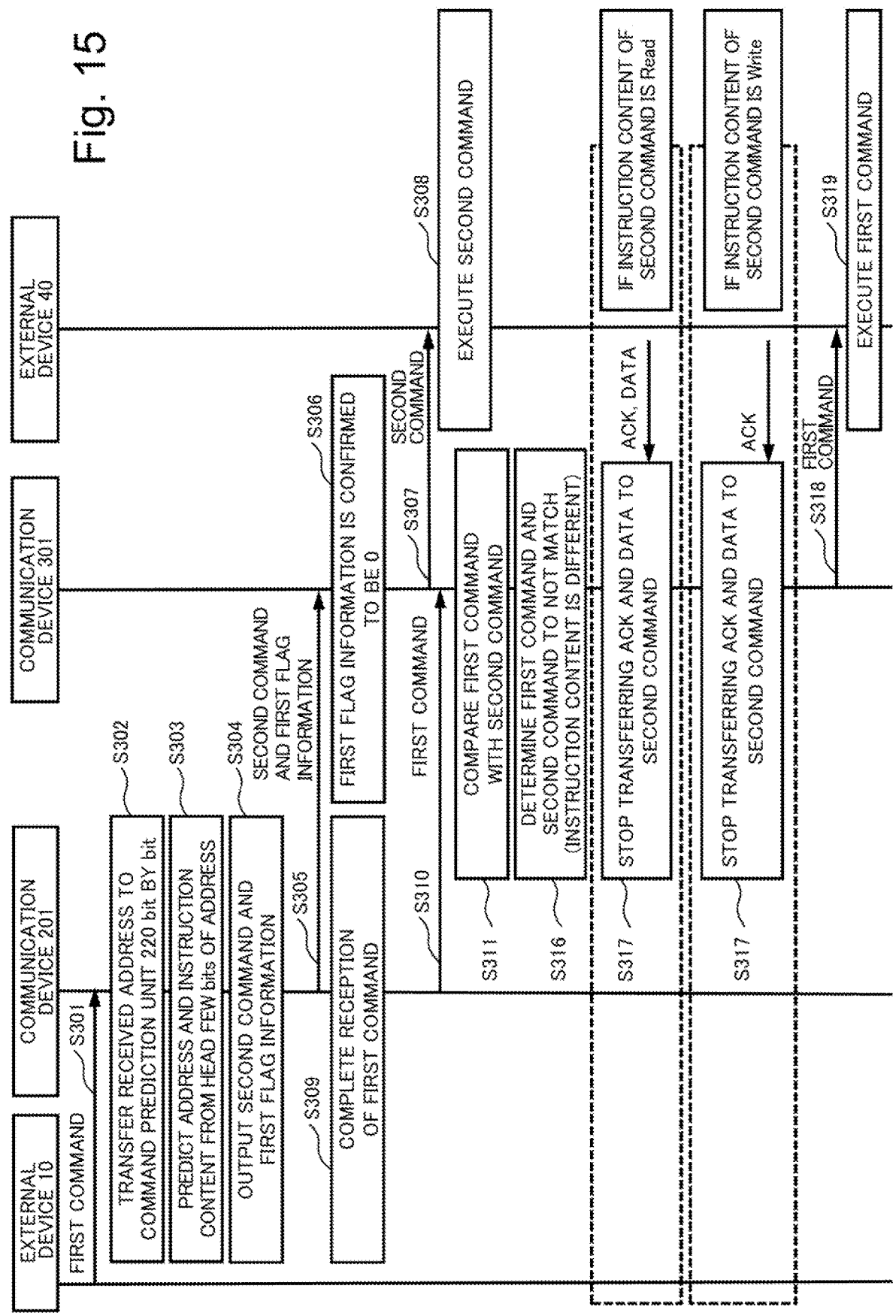
FIG. 15 is a flowchart illustrating an example of the operation of the communication system according to an example embodiment.

Subsequently, the operation of the communication system 3 according to the present example embodiment will be described below with reference to FIGS. 13 to 18. FIGS. 13 to 15 illustrate the operation in a case where the first flag information received by the communication device 301 indicates 0 (it is not necessary to wait for transmission of the second command).

First, the operation when the first command and the second command match will be described with reference to FIG. 13.

First, the external device 10 transmits the first command from the address portion to the communication device 201 (S301). The communication device 201 starts receiving the first command from the external device 10 using the communication processing unit 211. Every time 1 bit is received, the communication processing unit 211 transfers the received address to the command prediction unit 220 bit by bit (S302). The command prediction unit 220 predicts the first command using the prediction table 230 or the prediction table 250 (S303). Here, the address and the instruction content are predicted from the head few bits of the address. Then, at the time point when the first command can be predicted, the command prediction unit 220 outputs the predicted command as the second command to the communication processing unit 211 (S304). The command prediction unit 220 outputs the first flag information to the communication processing unit 211 (S304). For example, in a case where the transmission destination of the address and the instruction content can be predicted by the head 3 bits of the received address, the command prediction unit 220 outputs the predicted command to the communication processing unit 211 as a second command, and also outputs, to the communication processing unit 211, the first flag information associated to the second command. The communication processing unit 211 transmits the second command and the first flag information to the communication device 301 (S305). The communication processing unit 311 in the communication device 301 receives the second command and the first flag information from the communication device 201. The communication device 301 confirms the first flag information (S306). In a case where the first flag information indicates 0 (it is not necessary to wait for transmission of the second command), the communication processing unit 311 transmits the second command to the external device 40 (S307). The operation when the first flag information indicates 1 (it is necessary to wait for transmission of the second command) will be described later.

The external device 40 receives the second command from the communication device 301 and executes the instruction content included in the second command (S308).

On the other hand, upon completing the reception of the first command (S309), the communication processing unit 211 in the communication device 201 transfers the first command and the second command to the communication device 301 (S310).

The comparison unit 321 compares the first command with the second command (S311). When the first command and the second command match (S312), the communication processing unit 311 performs transfer of a response signal (ACK) to the second command and transfer of data to be transmitted and received between the external device 10 and the external device 40 based on the second command (S313). The operation when the first command and the second command do not match will be described later.

Due to this, similarly to the second example embodiment, the communication system 3 according to the present example embodiment can prevent the external device 10 from giving an unintended influence to the external device 40 by the second command, and can reduce the latency of the response to the command transmitted by the external device 10.

Figure 23C:
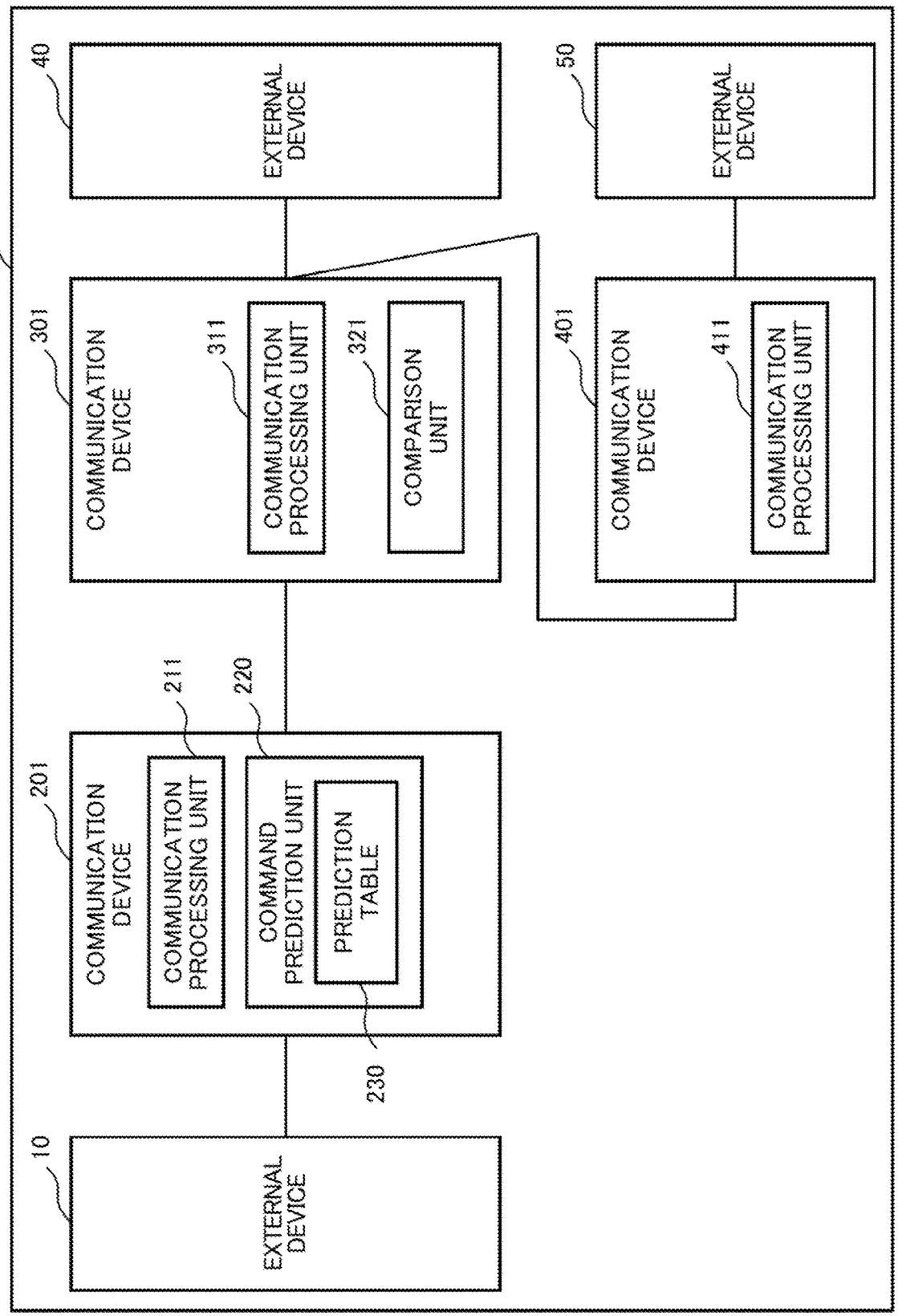
FIG. 23C is a view illustrating another configuration example of the communication system according to an example embodiment.

Next, the operation when the first command and the second command do not match, particularly when the addresses do not match will be described with reference to FIG. 14. The operations from S301 to S310 are the same as the above-described operations. The comparison unit 321 of the communication device 301 determines that the addresses of the first command and the second command do not match (S314). Since the second command has already been transmitted to the external device 40 in S307, the communication processing unit 311 executes the same operation as in S313. The communication processing unit 311 transmits the first command to the address described in the first command (S315). Here, a case where the address described in the first command indicates a communication device different from the communication device 301 will be described. FIG. 23C is a view illustrating another configuration example of the communication system according to an example embodiment. Similarly to FIG. 12, the communication system in FIG. 23C includes the external device 10, the communication device 201, the communication device 301, and the external device 40. The communication system in FIG. 23C includes a communication device 401 and the external device 50. The communication device 401 includes a communication processing unit 411. Here, for example, in a case where the address described in the first command indicates the communication device 401, the communication processing unit 311 transmits the first command to the external device 50 via the communication device 401. The external device 50 executes the first command. Note that S313 in FIGS. 13 and 14 is an example in a case where the instruction content in the second command is Read or Write, but the second command is not limited to them.

Due to this, in the communication system 3 according to the present example embodiment, similarly to the second example embodiment, even when a command is transmitted to a wrong address in command prediction, the communication device 301 does not perform cancellation of the command. Therefore, by preventing unnecessary cancellation, it is possible to prevent waste of communication resources.

Next, the operation when the first command and the second command do not match, in particular, when the instruction contents do not match will be described with reference to FIG. 15. The operations from S301 to S310 are the same as the above-described operations. The comparison unit 321 determines that the instruction contents of the first command and the second command do not match (S316). The communication processing unit 311 stops the transfer of the ACK for the second command and the transfer of the data transmitted and received between the external device 10 and the external device 40 based on the second command (S317).

The communication processing unit 311 transmits the first command to the external device 40 (S318). The external device 40 executes the first command (S319). Due to this, in the communication system 3 according to the present example embodiment, similarly to the second example embodiment, the communication system 3 can prevent a wrong command from consuming various resources of the communication device 301 and the like.

Figure 16:
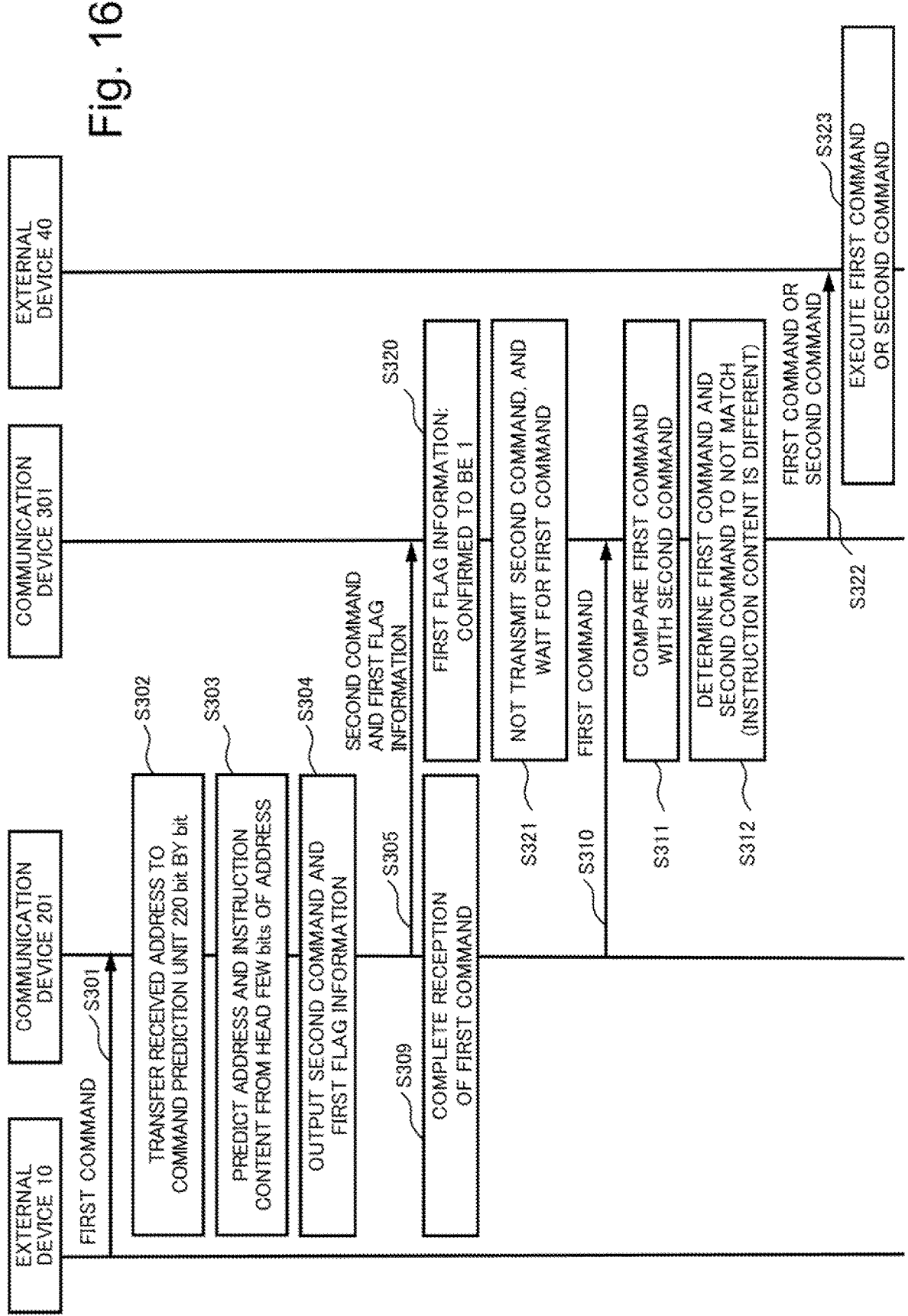
FIG. 16 is a flowchart illustrating an example of the operation of the communication system according to an example embodiment.
Figure 17:
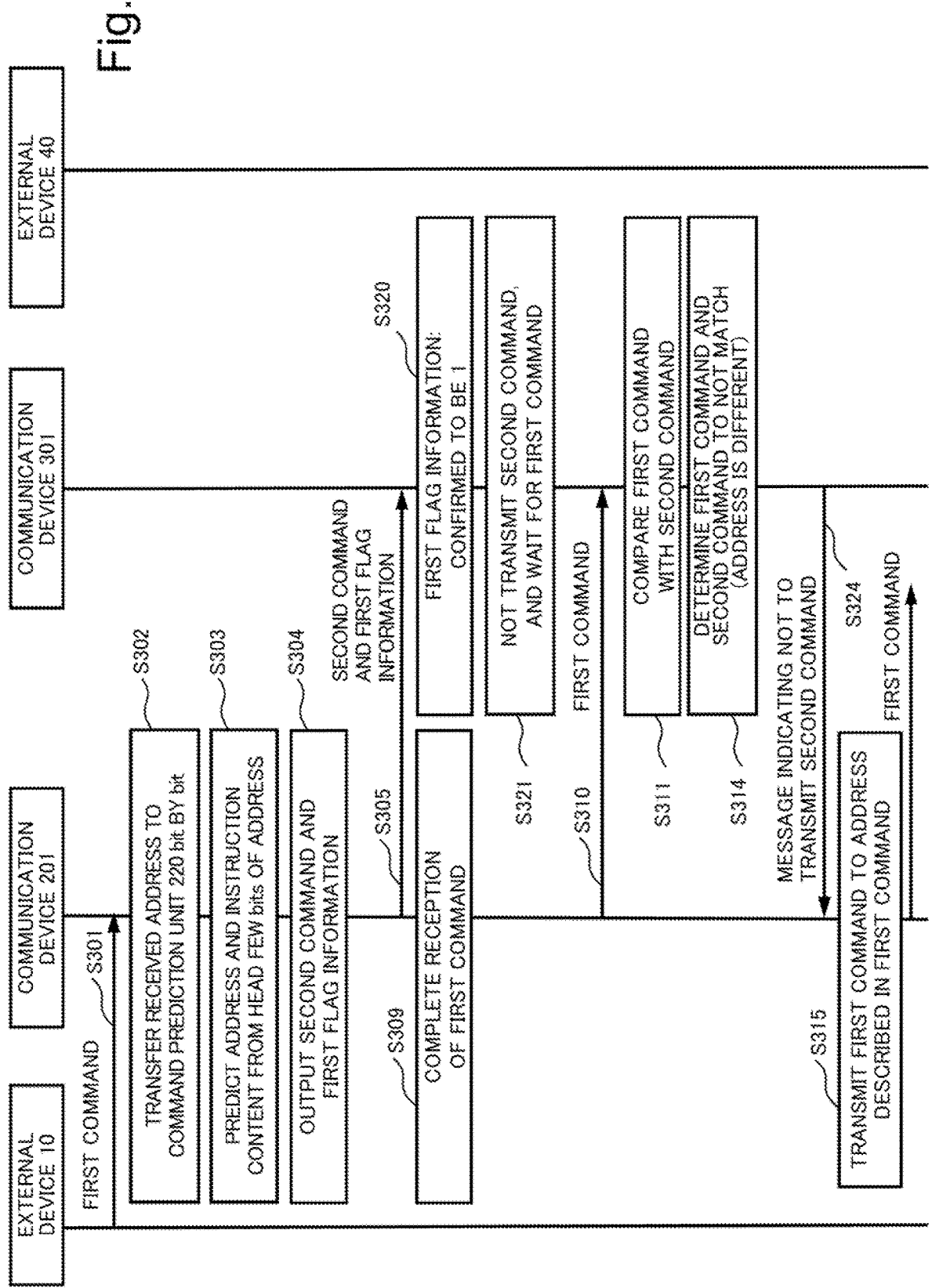
FIG. 17 is a flowchart illustrating an example of the operation of the communication system according to an example embodiment.
Figure 18:
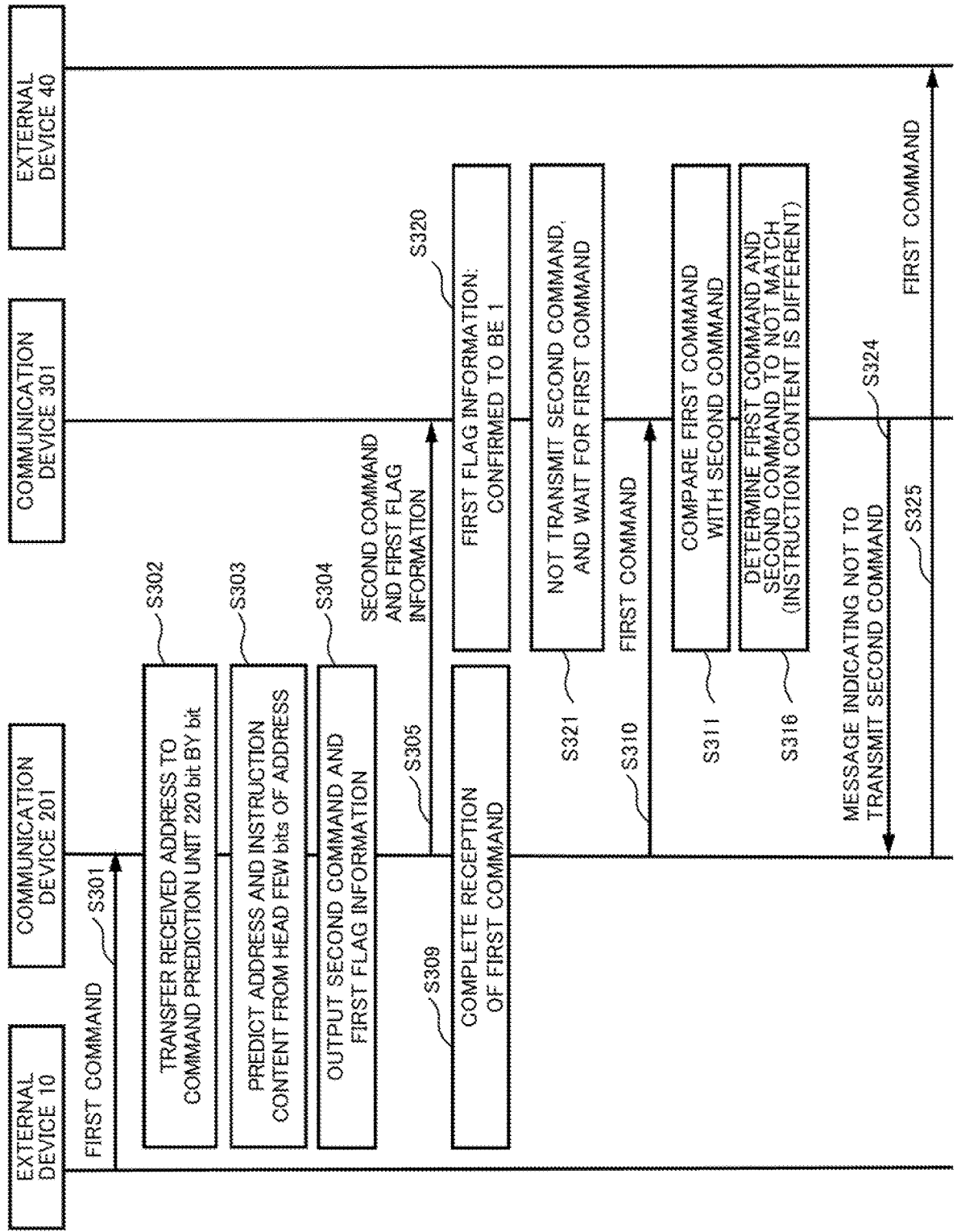
FIG. 18 is a flowchart illustrating an example of the operation of the communication system according to an example embodiment.

Next, the operation when the first flag information indicates 1 (it is necessary to wait for transmission of the second command) will be described with reference to FIGS. 16 to 18. First, the operation when the first command and the second command match will be described with reference to FIG. 16.

The operations from S301 to S305 are the same as the above-described operations. When the first flag information indicates 1 (S320), the communication device 301 waits for the first command without transmitting the received second command to the external device 40 (S321). The operations from S309 to S312 are the same as the above-described operations. After executing the operation of S312, the communication device 301 transmits the first command or the second command to the external device 40 (S322).

The external device 40 executes the first command or the second command (S323).

Due to this, similarly to the second example embodiment, in a case where the predicted command (second command) has a large influence on the external device 40, the communication system 3 according to the present example embodiment can prevent an unintended large influence from being given to the external device 40.

Next, a case where the first flag information indicates 1 and the comparison result between the first command and the second command indicates that the address of the first command and the address of the second command do not match will be described with reference to FIG. 17. In a case where the first flag information indicates 1 (in a case where it is necessary to wait for transmission of the second command) and the comparison result between the first command and the second command indicates that the address of the first command and the address of the second command do not match, the communication processing unit 311 transmits, to the communication device 201, a message indicating that the communication processing unit 311 does not transmit the second command to the external device 40 (S324). The communication processing unit 211 executes the operation of S315 triggered by the reception of the message indicating that the communication processing unit 311 does not transmit the second command to the external device 40. Operations other than S324 are as described above.

Due to this, similarly to the second example embodiment, in a case where the predicted command (second command) has a large influence on the external device 40, the communication system 3 according to the present example embodiment can prevent an unintended large influence from being given to the external device 40, and transmit the first command to an intended communication device.

Next, a case where the first flag information indicates 1, and the comparison result between the first command and the second command indicates that the instruction content in the first command and the instruction content in the second command do not match will be described with reference to FIG. 18. In FIG. 18, operations other than S325 are the same as those described above. In S325, when the message indicative of not transmitting the second command is received in S324, the first command is transmitted to the communication device 301. The communication device 301 transmits the first command to the external device 40. The communication processing unit 311 may transmit the first command to the external device 40 after performing the operation of S316. In this case, the operations of S324 and S325 become unnecessary. By combining S325 and the above-described operation as in FIG. 18, in a case where the predicted command (second command) has a large influence on the external device 40, the communication system 3 according to the present example embodiment can prevent an unintended large influence from being given to the external device 40, and transmit the first command to the external device 40.

Fourth Example Embodiment

Figure 19:
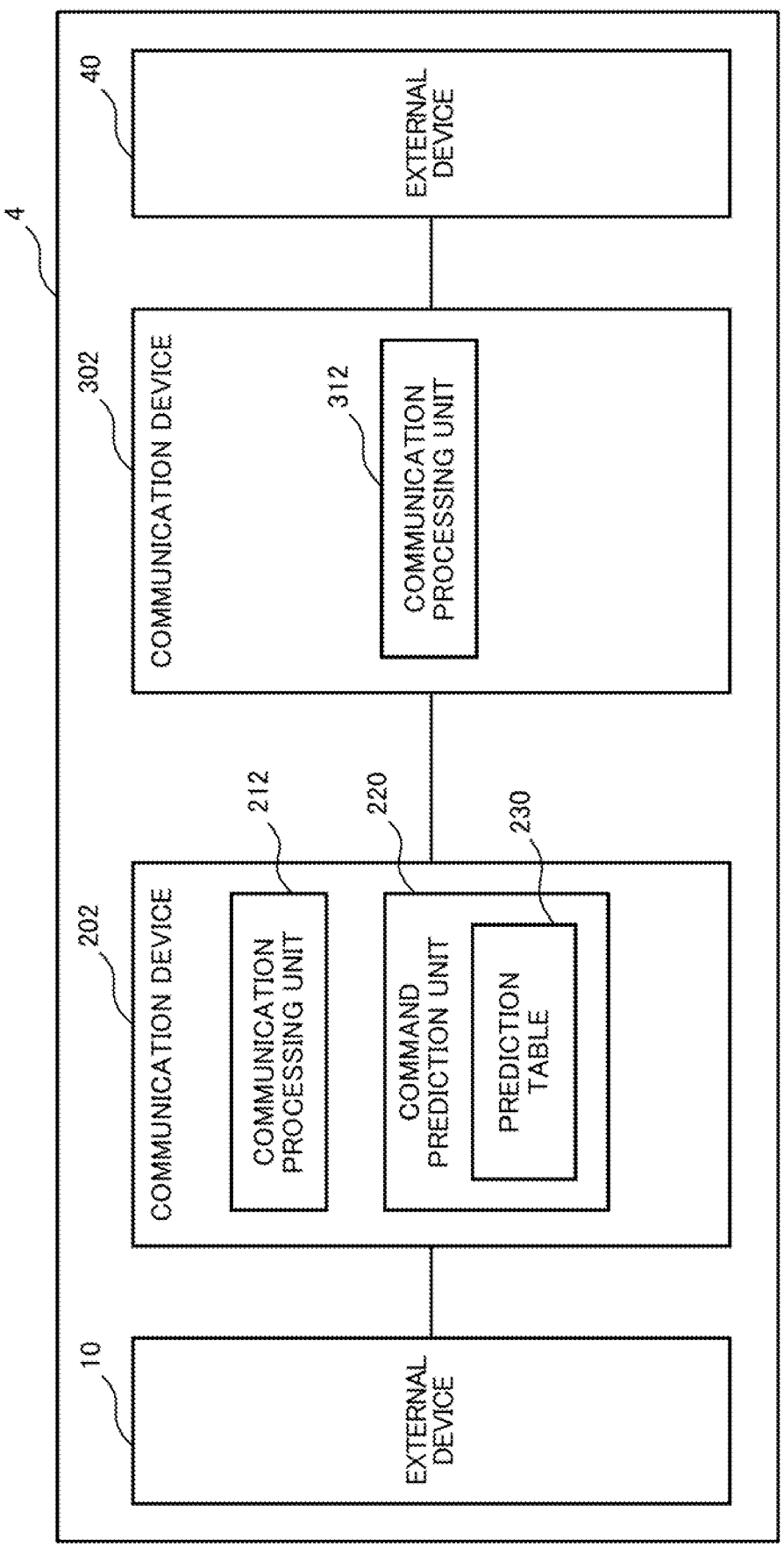
FIG. 19 is a view illustrating a configuration example of the communication system according to an example embodiment.

FIG. 19 illustrates a configuration example of a communication system 4 according to the present example embodiment. In the present example embodiment, a communication device 202 includes a communication processing unit 212 and the command prediction unit 220.

The communication processing unit 212 is connected to the external device 10 and a communication device 302, similarly to the communication processing unit 21 in the first example embodiment. The communication processing unit 212 receives a command for the external device 40 and transmits the command, the first flag information, and the second flag information to other devices including the communication device 302. The communication processing unit 212 outputs the second flag information, and transmits the second flag information to other devices including the communication device 302.

The second flag information indicates that the first command transmitted by the communication device 202 is an actual command transmitted by the external device 10.

The command prediction unit 220 holds a prediction table 230 illustrated in FIG. 4 or a prediction table 250 illustrated in FIG. 5. The command prediction unit 220 predicts a command similarly to the command prediction unit 22 in the first example embodiment, and outputs the predicted command as a second command. The command prediction unit 220 outputs the first flag information, similarly to the command prediction unit 22 in the first example embodiment.

The first flag information indicates whether the communication device 302 needs to wait for transmission of the second command to the external device 40. More specifically, in a case where it is necessary for the communication device 302 to wait for transmission of the second command to the external device 40, the first flag information is given 1. For the second command in which the first flag information is not given 1, the first flag information is given 0.

In other words, the first flag information indicates whether the second command greatly affects the external device 40. For example, in a case where the transmission destination is the Read & Clear register illustrated in the first example embodiment, the instruction content in the second command is Read, and the prediction of the first command is wrong (in a case where the first command and the second command do not match), unintended data erasure is performed when the command is transmitted to the register. In such a case, there is a possibility that the second command greatly affects the external device 40, and the first flag information in the second command is given 1.

Similarly to the first example embodiment, the condition in which the first flag information is given 1 is specifically that a large influence is given to the external device when the second command is executed by the external device. The condition in which the first flag information is given 0 is that the first flag information is not given 1.

The communication device 302 in the present example embodiment includes a communication processing unit 312. The communication processing unit 312 is connected to the external device 40 and the communication device 202 similarly to the communication processing unit 31 in the first example embodiment. The communication processing unit 312 receives the command for the external device 40, the first flag information, and the comparison result from the communication device 202. In a case where the first flag information indicates 0 (it is not necessary to wait for transmission of the second command), the communication processing unit 312 transmits a command to the external device 40. In a case where the first flag information indicates 1 (it is necessary to wait for transmission of the second command), the communication processing unit 312 waits for transmission of the command to the external device 40 until the comparison result is received.

Figure 20:
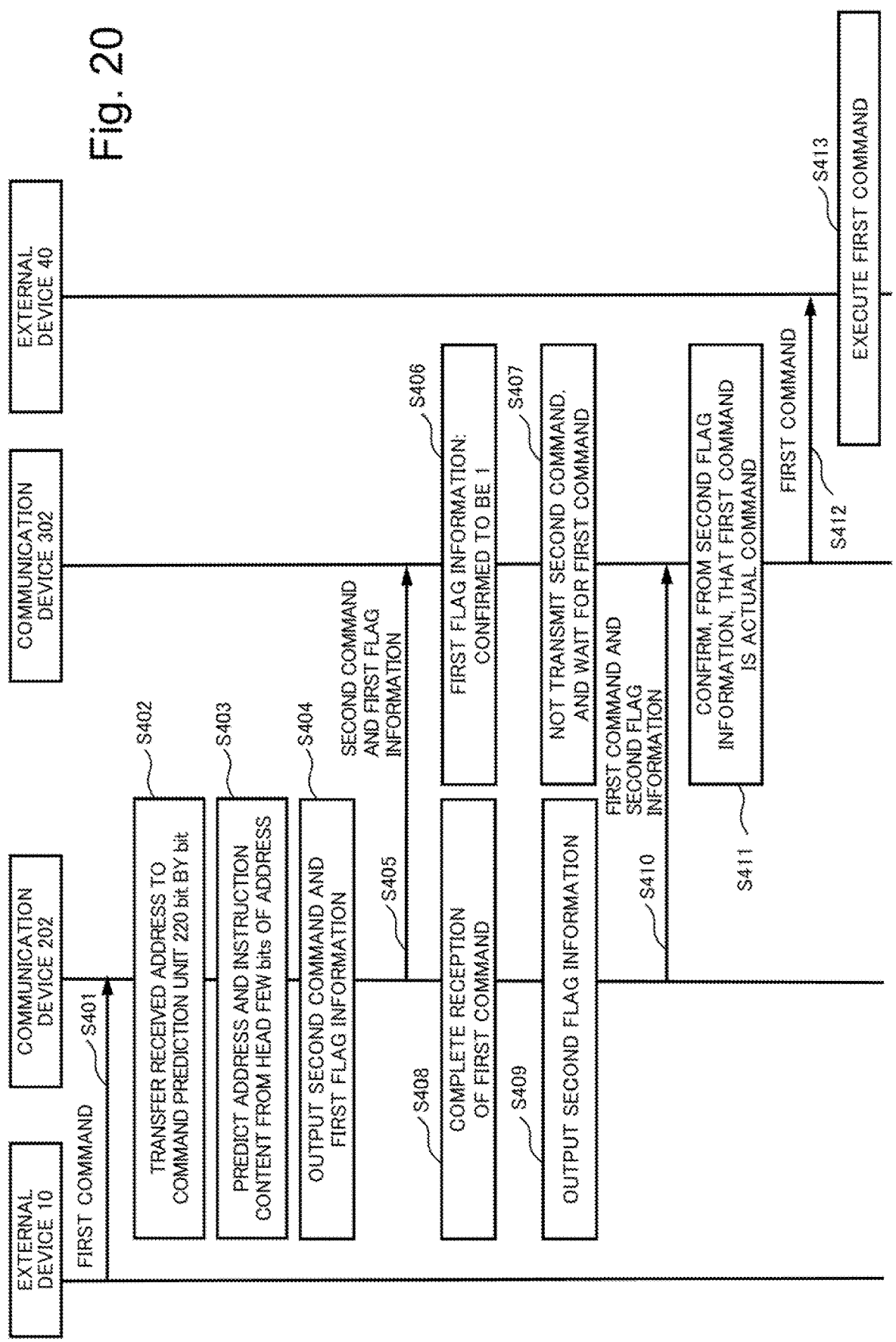
FIG. 20 is a flowchart illustrating an example of the operation of the communication system according to an example embodiment.

Subsequently, the operation of the communication system 4 according to the present example embodiment will be described below with reference to FIG. 20. FIG. 20 illustrates the operation in a case where communication processing unit 312 needs to wait for transmission of a command to the external device 40 (a case where the received first flag information indicates 1).

First, the external device 10 transmits the first command from the address portion to the communication device 202 (S401). The communication device 202 starts receiving the first command from the external device 10 using the communication processing unit 212. Every time 1 bit is received, the communication processing unit 212 transfers the received address to the command prediction unit 220 bit by bit (S402).

The command prediction unit 220 predicts the first command using the prediction table 230 or the prediction table 250 (S403). Here, the address and the instruction content are predicted from the head few bits of the address. Then, at the time point when the first command can be predicted, the command prediction unit 220 outputs the predicted command as the second command to the communication processing unit 212 (S404). The command prediction unit 220 outputs the first flag information to the communication processing unit 212 (S404). For example, in a case where the transmission destination of the address and the instruction content can be predicted by the head 3 bits of the received address, the command prediction unit 220 outputs the predicted command to the communication processing unit 212 as a second command, and also outputs, to the communication processing unit 212, the first flag information associated to the second command. The communication processing unit 212 transmits the second command and the first flag information to the communication device 302 (S405). When the first flag information indicates 1 (S406), the communication device 302 waits for the first command without transmitting the received second command to the external device 40 (S407).

On the other hand, when the communication processing unit 212 in the communication device 202 completes the reception of the first command (S408), the communication device 202 outputs the second flag information (S409). The communication processing unit 212 transmits the first command and the second flag information to the communication device 302 (S410). When the communication device 302 confirms, from the second flag information, that the first command is an actual command transmitted by the external device 10 (S411), the communication processing unit 312 transmits the first command to the external device 40 (S412). The external device 40 executes the first command (S413).

Due to this, the communication system 4 according to the present example embodiment can prevent the external device 10 from giving an unintended influence to the external device 40 by the second command, and can reduce the latency of the response to the command transmitted by the external device 10. The communication system 4 according to the present example embodiment can achieve the above-described effects without including the comparison unit as described in the second example embodiment and the third example embodiment.

Figure 21:
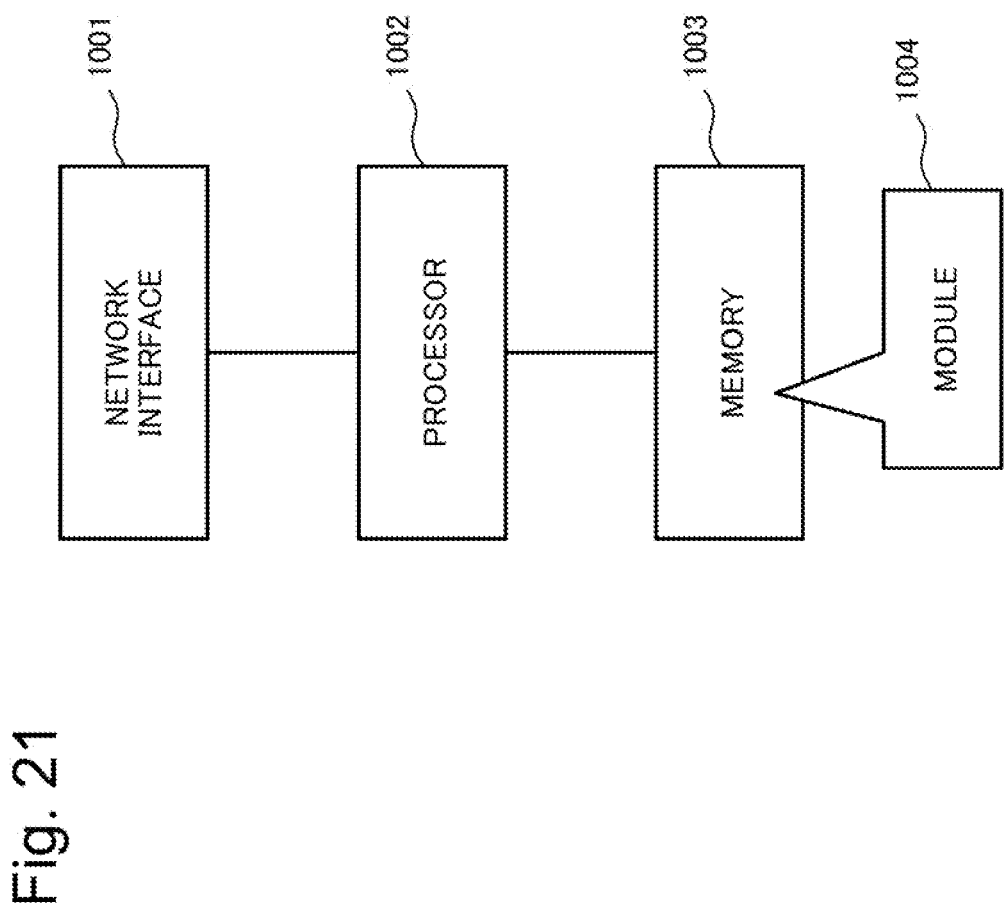
FIG. 21 is a view illustrating a configuration example of an external device according to a plurality of example embodiments.

Subsequently, configuration examples of the external device and the communication device according to the plurality of example embodiments described above will be described below. FIG. 21 is a configuration example of the external device according to the plurality of example embodiments described above. The external device according to the plurality of example embodiments described above includes, for example, a network interface 1001, a processor 1002, and a memory 1003.

The network interface 1001 is used for communicating with the external device and the communication device according to the plurality of example embodiments described above, for example. The network interface may include, for example, a network interface card and a bus device.

The processor 1002 may include, for example, a microprocessor, a micro processing unit (MPU), or a central processing unit (CPU). The processor 1002 may include a plurality of processors.

The memory 1003 includes a volatile memory and a nonvolatile memory. The memory 1003 may include a plurality of physically independent memory devices. The volatile memory is, for example, a static random access memory (SRAM) or a dynamic RAM (DRAM), or a discretionary combination of these. The nonvolatile memory is a mask read only memory (MROM), an electrically erasable programmable ROM (EEPROM), a flash memory, or a hard disk drive, or a discretionary combination of these. The memory 1003 may include a storage disposed away from the processor 1002. In this case, the processor 1002 may access the memory 1003 via the network interface 1001 or an I/O interface (not illustrated).

The memory 1003 may store one or more software modules (computer programs) 1004 including orders and data for performing processing by the external device described in the plurality of example embodiments described above. In some implementations, the processor 1002 may be configured to perform the processing of the external device described in the example embodiments described above by reading and executing the software module 1004 from the memory 1003.

Figure 22:
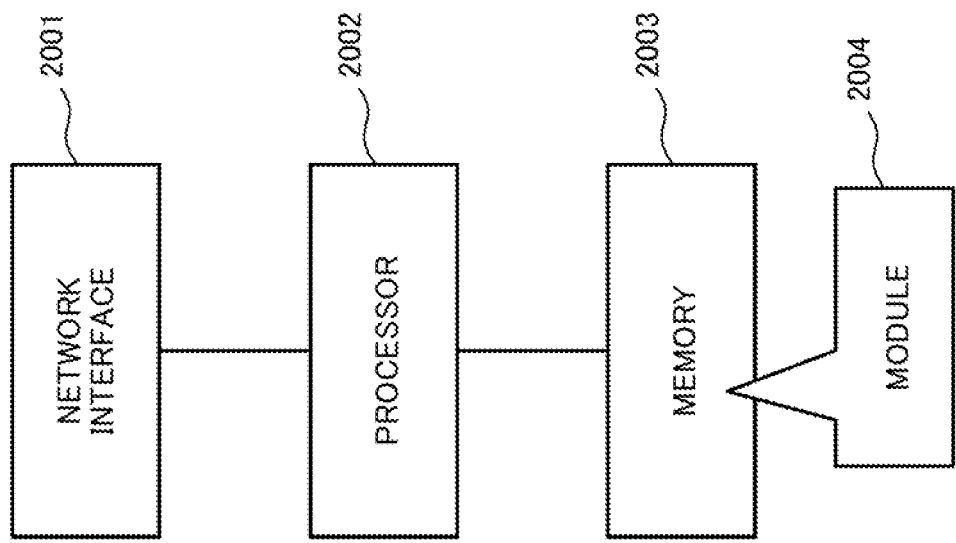
FIG. 22 is a view illustrating a configuration example of a communication device according to a plurality of example embodiments.

FIG. 22 is a configuration example of the communication device according to the plurality of example embodiments described above. The external device according to the plurality of example embodiments described above includes, for example, a network interface 2001, a processor 2002, and a memory 2003.

The network interface 2001 is used for communicating with the external device and the communication device according to the plurality of example embodiments described above, for example. The network interface may include, for example, a network interface card and a bus device.

The processor 2002 may include, for example, a microprocessor, a micro processing unit (MPU), or a central processing unit (CPU). The processor 2002 may include a plurality of processors.

The memory 2003 includes a volatile memory and a nonvolatile memory. The memory 2003 may include a plurality of physically independent memory devices. The volatile memory is, for example, a static random access memory (SRAM) or a dynamic RAM (DRAM), or a discretionary combination of these. The nonvolatile memory is a mask read only memory (MROM), an electrically erasable programmable ROM (EEPROM), a flash memory, or a hard disk drive, or a discretionary combination of these. The memory 2003 may include a storage disposed away from the processor 2002. In this case, the processor 2002 may access the memory 2003 via the network interface 2001 or an I/O interface (not illustrated).

The memory 2003 may store one or more software modules (computer programs) 2004 including orders and data for performing processing by the external device described in the plurality of example embodiments described above. In some implementations, the processor 2002 may be configured to perform the processing of the external device described in the example embodiments described above by reading and executing the software module 2004 from the memory 2003. The processing of the external device described in the above-described example embodiments includes, for example, the communication processing unit, the command prediction unit, the prediction table, and the comparison unit described in the plurality of example embodiments described above.

The prediction table 230 or the prediction table 250 described in the plurality of example embodiments described above may include third flag information allocated for each second command. The third flag information indicates whether the second command described in the prediction table 230 is valid. The command prediction unit 220 may confirm the third flag information when the second command is output, and, only when the third flag information, the second command is valid, may output to the communication processing unit described in the plurality of example embodiments described above.

Figure 23D:
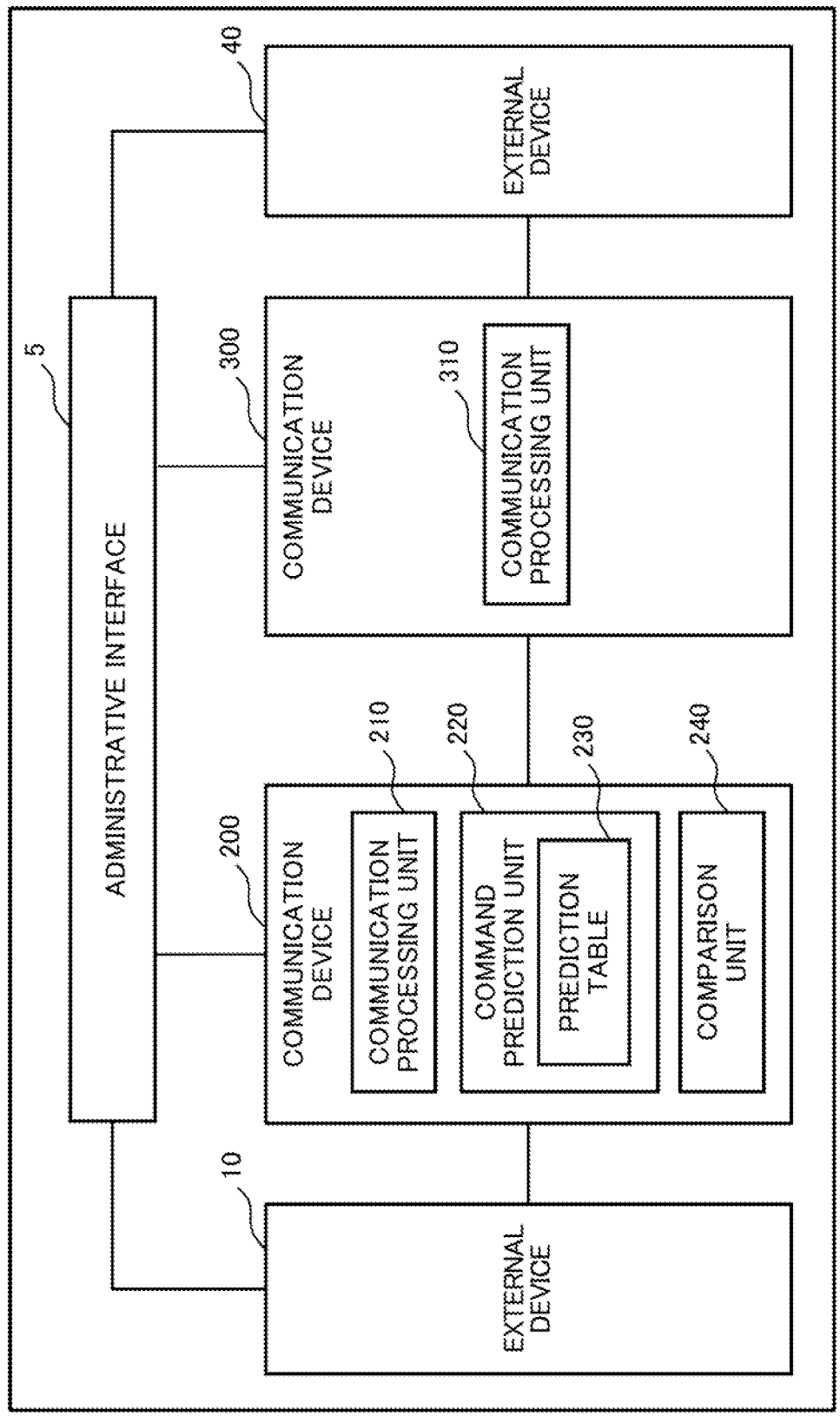
FIG. 23D is a view illustrating another configuration example of the communication system according to an example embodiment.

The external device or the communication device described in the plurality of example embodiments described above may include an administrative interface 5. FIG. 23D is a configuration example including the administrative interface 5, and is a view illustrating another configuration example of the communication system according to an example embodiment. The communication system in FIG. 23D includes the external device 10, the communication device 200, the communication device 300, and the external device 40, similarly to the communication system of FIG. 3. Similarly to FIG. 3, the communication device 200 in FIG. 23D includes the communication processing unit 210, the command prediction unit 220, and the comparison unit 240, and the communication device 300 includes the communication processing unit 310. The communication system in FIG. 23A includes the administrative interface 5. The administrative interface 5 transmits and receives an administrative command between the external device described in the plurality of example embodiments described above and the communication device described in the plurality of example embodiments described above. The communication device described in the plurality of example embodiments writes data into the prediction table 230 or the prediction table 250 in accordance with the administrative command.

The above-described example embodiments are merely examples regarding application of the technical idea obtained by the inventor of the present application. That is, the technical idea is not limited only to the above-described example embodiments, and various modifications are naturally possible.

(Supplementary Notes)

For example, some or all of the above example embodiments can be described as the following supplementary notes, but are not limited to the following.

(Supplementary Note 1)

A communication system including: a first external device: a second external device: a first communication device; and a second communication device, in which the first communication device includes a command prediction unit and a first communication processing unit, the command prediction unit predicts an address and instruction content in a first command from a part of the first command having been input from the first external device, outputs, as a second command, the address and the instruction content having been predicted, and outputs first flag information indicating whether the second communication device needs to wait for transmission of the second command, the first communication processing unit transmits the second command and the first flag information to the second communication device, the second communication device includes a second communication processing unit, and the second communication processing unit receives the second command and the first flag information, and transmits the second command to the second external device when the first flag information indicates that the second communication device does not need to wait for transmission of the second command.

(Supplementary Note 2)

The communication system according to Supplementary Note 1, wherein a part of the first command is a numerical value indicating the address.

(Supplementary Note 3)

The communication system according to Supplementary Note 2, wherein the numerical value indicating the address is the address that has been Huffman-compressed.

(Supplementary Note 4)

The communication system according to Supplementary Notes 1 to 3, wherein the second communication processing unit temporarily stops transmitting the second command to the second external device when the first flag information indicates that the second communication device needs to wait for execution of the second command.

(Supplementary Note 5)

The communication system according to Supplementary Note 4, wherein the first communication device further includes a first comparison unit that compares the first command with the second command and outputs a comparison result, the first communication processing unit transmits the comparison result to the second communication device, and the second communication processing unit determines whether to transmit the second command to the second external device based on the comparison result.

(Supplementary Note 6)

The communication system according to Supplementary Note 4, wherein the first communication processing unit transmits, in a case where reception of the first command is completed, the first command to the second communication device, the second communication device further includes a second comparison unit, the second communication processing unit receives the first command from the first communication device, the second comparison unit compares the first command with the second command and outputs a comparison result, and the second communication processing unit determines whether to transmit the second command to the second external device based on the comparison result.

(Supplementary Note 7)

The communication system according to Supplementary Note 4, wherein the first communication processing unit transmits, in a case where reception of the first command is completed, the first command and second flag information to the second communication device, the second flag information indicates that the first command is an actual command sent from the first external device, and the second communication processing unit transmits the first command or the second command to the second external device in response to reception of the first command and the second flag information.

(Supplementary Note 8)

The communication system according to Supplementary Note 5, wherein the first communication processing unit transmits, in a case where the comparison result indicates that the first command and the second command match, to the second communication device, the first command or a first message in which the comparison result indicates that the first command and the second command match, and the second communication processing unit transmits the first command or the second command to the second external device in response to reception of the first command or the first message.

(Supplementary Note 9)

The communication system according to Supplementary Note 6, wherein the second communication processing unit transmits, in a case where the comparison result indicates that the first command and the second command match, the first command or the second command to the second external device.

(Supplementary Note 10)

The communication system according to Supplementary Note 5 or 6, wherein the second communication processing unit transmits in a case where the comparison result indicates that the first command and the second command do not match, to the first communication device, a second message indicating that the second command is not transmitted to the second external device, and the first communication processing unit transmits in response to reception of the second message, the first command to a device indicated by the address described in the first command.

(Supplementary Note 11)

The communication system according to any one of Supplementary Notes 1 to 3, wherein the first communication processing unit, the first communication device further includes a first comparison unit, and the first comparison unit compares the first command with the second command, outputs a comparison result, and, in a case where the comparison result indicates that the first command and the second command do not match, transmits the first command to a device indicated by the address described in the first command.

(Supplementary Note 12)

The communication system according to any one of Supplementary Notes 1 to 3, wherein the second communication device further includes a second comparison unit, the second comparison unit compares the second the first command with the second command and outputs a comparison result, in a case where the comparison result indicates that the first command and the second command do not match, the second communication processing unit transmits, to the first communication device, a third message in which the comparison result indicates that the first command and the second command do not match, and the first communication processing unit, in response to reception of the third message, transmits the first command to a device indicated by the address described in the first command.

(Supplementary Note 13)

The communication system according to any one of Supplementary Notes 1 to 3, wherein the first communication processing unit further includes a first comparison unit, the first comparison unit compares the first command with the second command, outputs a comparison result, and in a case where the comparison result indicates that the first command and the second command do not match, does not transmit, to the first external device, a response signal to the second command, and transmits the first command to a device indicated by the address described in the first command.

(Supplementary Note 14)

The communication system according to any one of Supplementary Notes 1 to 3, wherein the second communication device further includes a second comparison unit, the second comparison unit compares the first command with the second command and outputs a comparison result, in a case where the comparison result indicates that the first command and the second command do not match, the second communication processing unit does not transmit, to the first external device, a response signal to the second command, and transmits, to the first communication device, a fourth message indicating not to transfer the response signal to the first external device, and the first communication processing unit transmits, in response to reception of the fourth message, the first command to a device indicated by the address described in the first command.

This application is based upon and claims the benefit of priority from Japanese patent application No. 2020-057408, filed on Mar. 27, 2020, the disclosure of which is incorporated herein in its entirety by reference.

REFERENCE SIGNS LIST 1 communication system
2 communication system
3 communication system
4 communication system
5 administrative interface
10 external device
20 communication device
21 communication processing unit
22 command processing unit
30 communication device
31 communication processing unit
40 external device
50 external device
200 communication device
201 communication device
202 communication device
210 communication processing unit
211 communication processing unit
212 communication processing unit
220 command prediction unit
230 prediction table
240 comparison unit
250 prediction table
300 communication device
301 communication device
310 communication processing unit
311 communication processing unit
312 communication processing unit
321 comparison unit
400 communication device
1001 network interface
1002 processor
1003 memory
1004 software module
2001 network interface
2002 processor
2003 memory
2004 software module

What is claimed is:

1. A latency reduction system for network communication including a first external device, a second external device, a first communication device, and a second communication device, wherein:

the first communication device includes a first processor and a first memory storing first instructions executable by the first processor to:

store a prediction table in which a plurality of third commands including a plurality of destination addresses and a plurality of instructions are arranged in order of probability that the first external device will transmit them to the first communication device;

receive a first command input from the first external device that includes a first destination address and a first instruction content;

compare first bits of the first command with first bits of the plurality of third commands, starting with the third command having a highest transmission probability to determine a matching third command;

specify the matching third command as a second command including a second destination address and a second instruction content;

determine whether the first command and the second command match;

send a determination result as to whether the first command and the second command match to the second communication device;

determine whether execution of the second command changes information held by a register associated with the second destination address;

if the information changes, create first flag information indicating that the second command needs wait for transmission to the second communication device;
if the information does not change, create the first flag information indicating that the second command does not need to wait for transmission to the second communication device;
accordingly send the second command and the first flag information to the second communication device;
the second communication device includes a second processor and a second memory storing second instructions executable by the second processor to:
when the first flag information indicates that waiting is not required, transmit the second command to the second external device; and
when the first flag information indicates that waiting is required, temporarily stop transmitting the second command to the second external device.

2. The communication system according to claim 1, wherein
a part of the first command is a numerical value indicating the first destination address.

3. The communication system according to claim 2, wherein
the numerical value has been Huffman-compressed.

4. The communication system according to claim 1, wherein
the first processor sends, when reception of the first command is completed, the first command and second flag information to the second communication device,
the second flag information indicates that the first command is an actual command sent from the first external device, and
the second processor transmits the first command or the second command to the second external device in response to reception of the first command and the second flag information.

5. The communication system according to claim 1, wherein
the first processor sends to the second communication device, when the first command and the second command match, the first command or a message indicating that the first command and the second command match, and
the second processor transmits the first command or the second command to the second external device in response to reception of the first command or the message.

6. The communication system according to claim 1, wherein
the second processor, when the first command and the second command do not match, sends,
to the first communication device, a message indicating that the second command has not been transmitted to the second external device, and
the first processor, in response to reception of the message, sends
the first command to a device indicated by the first destination address described in the first command.

7. The communication system according to claim 1, wherein
the first processor, when the first command and the second command do not match, send the first command to a device indicated by the first destination address described in the first command.

8. The communication system according to claim 1, wherein
the first processor, when the first command and the second command do not match, does not send, to the first external device, a response signal to the second command, and
the first processor sends the first command to a device indicated by the first destination address described in the first command.

9. A latency reduction system for network communication including a first external device, a second external device, a first communication device, and a second communication device, wherein:
the first communication device includes a first processor and a first memory storing first instructions executable by the first processor to:
store a prediction table in which a plurality of third commands including a plurality of destination addresses and a plurality of instructions are arranged in order of probability that the first external device will transmit them to the first communication device;
receive a first command input from the first external device that includes a first destination address and a first instruction content;
compare first bits of the first command with first bits of the plurality of third commands, starting with the third command having a highest transmission probability to determine a matching third command;
specify the matching third command as a second command including a second destination address and a second instruction content;
determine whether execution of the second command changes information held by a register associated with the second destination address;
if the information changes, create first flag information indicating that the second command needs wait for transmission to the second communication device;
if the information does not change, create the first flag information indicating that the second command does not need to wait for transmission to the second communication device;
accordingly the second command, and the first flag information to the second communication device;
send the first command to the second communication device when reception of the first command is completed;
the second communication device includes a second processor and a second memory storing second instructions executable by the second processor to:
when the first flag information indicates that waiting is not required, transmit the second command to the second external device;
when the first flag information indicates that waiting is required, temporarily stop transmitting the second command to the second external device; and
determine whether the first command and the second command match.

10. The communication system according to claim 9, wherein
the second processor, when the first command and the second command match, sends the first command or the second command to the second external device.

11. The communication system according to claim 9, wherein
the second processor, when the first command and the second command do not match, send, to the first communication device, a message indicating that the first command and the second command do not match, and the first processor, in response to reception of the message, transmits the first command to a device indicated by the first destination address described in the first command.

12. The communication system according to claim 9, wherein the second processor, when the first command and the second command do not match, does not send, to the first external device, a response signal to the second command, and the second processor sends, to the first communication device, a message indicating not to transfer a response signal to the first external device, and the first processor sends, in response to reception of the message, the first command to a device indicated by the first destination address described in the first command.

* * * * *